United States Patent
Bista et al.

(10) Patent No.: US 12,423,530 B2
(45) Date of Patent: Sep. 23, 2025

(54) TRAINING DATA GENERATION TO FACILITATE FINE-TUNING EMBEDDING MODELS

(71) Applicant: Oracle International Corporation, Redwood Shores, CA (US)

(72) Inventors: Umanga Bista, Southbank (AU); Vladislav Blinov, Melbourne (AU); Mark Edward Johnson, Sydney (AU); Ahmed Ataallah Ataallah Abobakr, Geelong (AU); Thanh Long Duong, Seabrook (AU); Srinivasa Phani Kumar Gadde, Fremont, CA (US); Vishal Vishnoi, Redwood City, CA (US); Elias Luqman Jalaluddin, Seattle, WA (US); Xin Xu, San Jose, CA (US); Shivashankar Subramanian, Melbourne (AU)

(73) Assignee: Oracle International Corporation, Redwood Shores (CA)

( * ) Notice: Subject to any disclaimer, the term of this patent is extended or adjusted under 35 U.S.C. 154(b) by 230 days.

(21) Appl. No.: 18/314,509

(22) Filed: May 9, 2023

(65) Prior Publication Data
US 2023/0376700 A1    Nov. 23, 2023

Related U.S. Application Data

(60) Provisional application No. 63/342,959, filed on May 17, 2022.

(51) Int. Cl.
*G06F 40/58*    (2020.01)
*G06F 40/35*    (2020.01)
(Continued)

(52) U.S. Cl.
CPC .............. *G06F 40/58* (2020.01); *G06F 40/35* (2020.01); *G10L 15/22* (2013.01); *H04L 51/02* (2013.01); *G06F 40/205* (2020.01); *G06F 40/263* (2020.01)

(58) Field of Classification Search
None
See application file for complete search history.

(56) References Cited

U.S. PATENT DOCUMENTS 11,544,317 B1 *   1/2023   Pancha ................... G06F 40/30
12,086,565 B2 *   9/2024   Syeda-Mahmood ... G06F 40/30
(Continued)

OTHER PUBLICATIONS

Ren, Fuji, and Siyuan Xue. "Intention detection based on siamese neural network with triplet loss." IEEE Access 8 (2020): 82242-82254. (Year: 2020).*

(Continued)

*Primary Examiner* — Douglas Godbold
(74) *Attorney, Agent, or Firm* — Kilpatrick Townsend & Stockton LLP

(57) ABSTRACT

Techniques are provided for generating training data to facilitate fine-tuning embedding models. Training data including anchor utterances is obtained. Positive utterances and negative utterances are generated from the anchor utterances. Tuples including the anchor utterances, the positive utterances, and the negative utterances are formed. Embeddings for the tuples are generated and a pre-trained embedding model is fine-tuned based on the embeddings. The fine-tuned model can be deployed to a system.

20 Claims, 11 Drawing Sheets

(51) Int. Cl.
  *G10L 15/22* (2006.01)
  *H04L 51/02* (2022.01)
  *G06F 40/205* (2020.01)
  *G06F 40/263* (2020.01)

(56) References Cited

U.S. PATENT DOCUMENTS

| | | | | |
|---|---|---|---|---|
| 2020/0349921 | A1* | 11/2020 | Jansen | G10L 25/51 |
| 2023/0070715 | A1* | 3/2023 | Pajak | G06N 3/09 |
| 2023/0086302 | A1* | 3/2023 | Bhagavath | G10L 15/22 |
| | | | | 704/9 |
| 2023/0154172 | A1* | 5/2023 | Wasnik | G06V 10/82 |
| | | | | 382/157 |
| 2023/0237261 | A1* | 7/2023 | Farre Guiu | G06F 40/242 |
| | | | | 704/9 |
| 2024/0087683 | A1* | 3/2024 | Sharma | G16B 50/10 |
| 2024/0256796 | A1* | 8/2024 | Hyland | H04L 51/02 |

OTHER PUBLICATIONS

Bowman et al., A Large Annotated Corpus for Learning Natural Language Inference, Proceedings of the 2015 Conference on Empirical Methods in Natural Language Processing, Sep. 2015, pp. 632-642.

Cao et al., Exploring the Impact of Negative Samples of Contrastive Learning: A Case Study of Sentence Embedding, Available Online at: https://arxiv.org/pdf/2202.13093.pdf, Mar. 16, 2022, 15 pages.

Chen et al., Zero-Shot Cross-Lingual Transfer of Neural Machine Translation with Multilingual Pretrained Encoders, Available Online at: https://arxiv.org/pdf/2104.08757.pdf, Nov. 5, 2021, 12 pages.

Fang et al., CERT: Contrastive Self-Supervised Learning for Language Understanding, Available Online at: https://arxiv.org/abs/2005.12766, Jun. 18, 2020, pp. 1-16.

Gao et al., SimCSE: Simple Contrastive Learning of Sentence Embeddings, Available Online at: https://arxiv.org/abs/2104.08821, Sep. 9, 2021, 17 pages.

Henderson et al., ConveRT: Efficient and Accurate Conversational Representations from Transformers, Available Online at: https://arxiv.org/pdf/1911.03688.pdf, Apr. 29, 2020, 11 pages.

Kim et al., Self-Guided Contrastive Learning for BERT Sentence Representations, Available Online at: https://aclanthology.org/2021.acl-long.197.pdf, Jun. 3, 2021, 13 pages.

Nishikawa et al., EASE: Entity-Aware Contrastive Learning of Sentence Embedding, Available Online at: https://arxiv.org/pdf/2205.04260.pdf, May 9, 2022, 16 pages.

Tan et al., A Sentence is Worth 128 Pseudo Tokens: A Semantic-Aware Contrastive Learning Framework for Sentence Embeddings, Available Online at: https://arxiv.org/abs/2203.05877, Mar. 11, 2022, 12 pages.

Wang et al., SNCSE: Contrastive Learning for Unsupervised Sentence Embedding with Soft Negative Samples, Available Online at: https://arxiv.org/abs/2201.05979, Mar. 2, 2022, 7 pages.

Wei et al., EDA: Easy Data Augmentation Techniques for Boosting performance on Text Classification Tasks, Proceedings of the 2019 Conference on Empirical Methods in Natural Language Processing and the 9th International Joint Conference on Natural Language Processing, Nov. 3-7, 2019, pp. 6382-6388.

Yang et al., Multilingual Universal Sentence Encoder for Semantic Retrieval, Available Online at: https://arxiv.org/pdf/1907.04307.pdf, Jul. 9, 2019, 6 pages.

* cited by examiner

TRAINING DATA GENERATION TO FACILITATE FINE-TUNING EMBEDDING MODELS

CROSS-REFERENCE TO RELATED APPLICATIONS

The present application is a non-provisional application of and claims the benefit and priority under 35 U.S.C. § 119(e) of U.S. Provisional Application No. 63/342,959 having a filing date of May 17, 2022, the entire contents of which are incorporated herein by reference for all purposes.

FIELD

The present disclosure relates generally to artificial intelligence techniques, and more particularly, to techniques for generating training data to facilitate fine-tuning embedding models.

BACKGROUND

Artificial intelligence has many applications. To illustrate, many users around the world use instant messaging or chat platforms in order to get instant reactions. Organizations often use these instant messaging or chat platforms to engage with customers (or end users) in live conversations. However, it can be very costly for organizations to employ service people to engage in live communication with customers or end users. Chatbots or bots have been developed to simulate conversations with end users, especially over the Internet. End users can communicate with such bots through messaging apps. An intelligent bot, generally a bot powered by artificial intelligence (AI), can communicate intelligently and contextually in live conversations with end users, which allows for a more natural conversation and an improved conversational experience. Instead of relying on a fixed set of keywords or commands, intelligent bots may be able to receive utterances of end users in natural language, understand their intentions, and respond accordingly.

However, artificial intelligence-based solutions, such as chatbots, can be difficult to build because these automated solutions require specific knowledge in certain fields and the application of certain techniques that may be solely within the capabilities of specialized developers. As part of building such chatbots, a developer may first understand the needs of enterprises and end users. The developer may then analyze and make decisions related to, for example, selecting data sets to be used for the analysis, preparing the input data sets for analysis (e.g., cleansing the data, extracting, formatting, and/or transforming the data prior to analysis, performing data features engineering, etc.), identifying an appropriate machine learning (ML) technique(s) or model(s) for performing the analysis, and improving the technique or model to improve results/outcomes based upon feedback. The task of identifying an appropriate model may include developing multiple models, possibly in parallel, iteratively testing and experimenting with these models, before identifying a particular model (or models) for use. Further, supervised learning-based solutions typically involve a training phase, followed by an application (i.e., inference) phase, and iterative loops between the training phase and the application phase. The developer may be responsible for carefully implementing and monitoring these phases to achieve optimal solutions. For example, to train the ML technique(s) or model(s), precise training data is required to enable the algorithms to understand and learn certain patterns or features (e.g., for chatbots—intent extraction and careful syntactic analysis, not just raw language processing) that the ML technique(s) or model(s) will use to predict the outcome desired (e.g., inference of an intent from an utterance). In order to ensure the ML technique(s) or model(s) learn these patterns and features properly, the developer may be responsible for selecting, enriching, and optimizing sets of training data for the ML technique(s) or model(s).

BRIEF SUMMARY

Techniques are disclosed herein for generating training data to facilitate fine-tuning embedding models.

In various embodiments, a computer-implemented method includes accessing training data, the training data comprising a plurality of anchor utterances; generating positive utterances from anchor utterances using: (i) a translation operation, (ii) one or more perturbation operations, (iii) one or more augmentation operations, or (iv) any combination thereof, and wherein the positive utterances are semantically similar to the anchor utterances; generating negative utterances from the anchor utterances using: (i) one or more augmentation operations, (ii) one or more sampling operations, or (iii) any combination thereof, and wherein negative utterances are semantically dissimilar to the anchor utterances; forming a set of tuples, each tuple of the set of tuples comprising an anchor utterance, a positive utterance selected from the positive utterances, and one or more negative utterances selected from the negative utterances, wherein a positive utterance in a respective tuple is different than positive utterances in other tuples of the tuples; generating a plurality of embeddings for each tuple of the set of tuples using a pre-trained embedding model, wherein, for a respective tuple of the set of tuples, an embedding of the plurality of embeddings is generated for the anchor utterance, the positive utterance, and the one or more negative utterances of the respective tuple; generating a fine-tuned model by fine-tuning the pre-trained embedding model, wherein fine-tuning the pre-trained embedding model includes applying a loss function to the plurality of embeddings for each tuple of the set of tuples and minimizing the loss function for each tuple of the set of tuples; and deploying the fine-tuned model to a system.

In some embodiments, each positive utterance of the positive utterances is generated by performing one or more translation, perturbation, and augmentation operations on an anchor utterance of the plurality of anchor utterances.

In some embodiments, each positive utterance of the positive utterances has a same intent class as at least one anchor utterance of the plurality of anchor utterances.

In some embodiments, each negative utterance of the negative utterances is generated by performing one or more augmentation and/or sampling operations on an anchor utterance of the plurality of anchor utterances.

In some embodiments, each negative utterance of the negative utterances has a different intent class as at least one anchor utterance of the plurality of anchor utterances.

In some embodiments, the loss function is a contrastive loss function, and wherein the contrastive loss function maximizes a similarity between one or more anchor utterances of the plurality of anchor utterances and one or more positive utterances of the positive utterances.

In some embodiments, the loss function is a contrastive loss function, and wherein the contrastive loss function minimizes a similarity between one or more anchor utterances of the plurality of anchor utterances and one or more negative utterances of the negative utterances.

In some embodiments, the method further includes accessing an utterance; inputting the utterance into the system in which the fine-tuned model is deployed; generating, using the fine-tuned model, an embedding for the utterance; recognizing an intent of the utterance based on the embedding; and outputting results of a skill performed by the system in which the fine-tuned model is deployed based on the recognized intent.

Some embodiments include a system including one or more processors and one or more computer-readable media storing instructions which, when executed by the one or more processors, cause the system to perform part or all of the operations and/or methods disclosed herein.

Some embodiments include one or more non-transitory computer-readable media storing instructions which, when executed by one or more processors, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
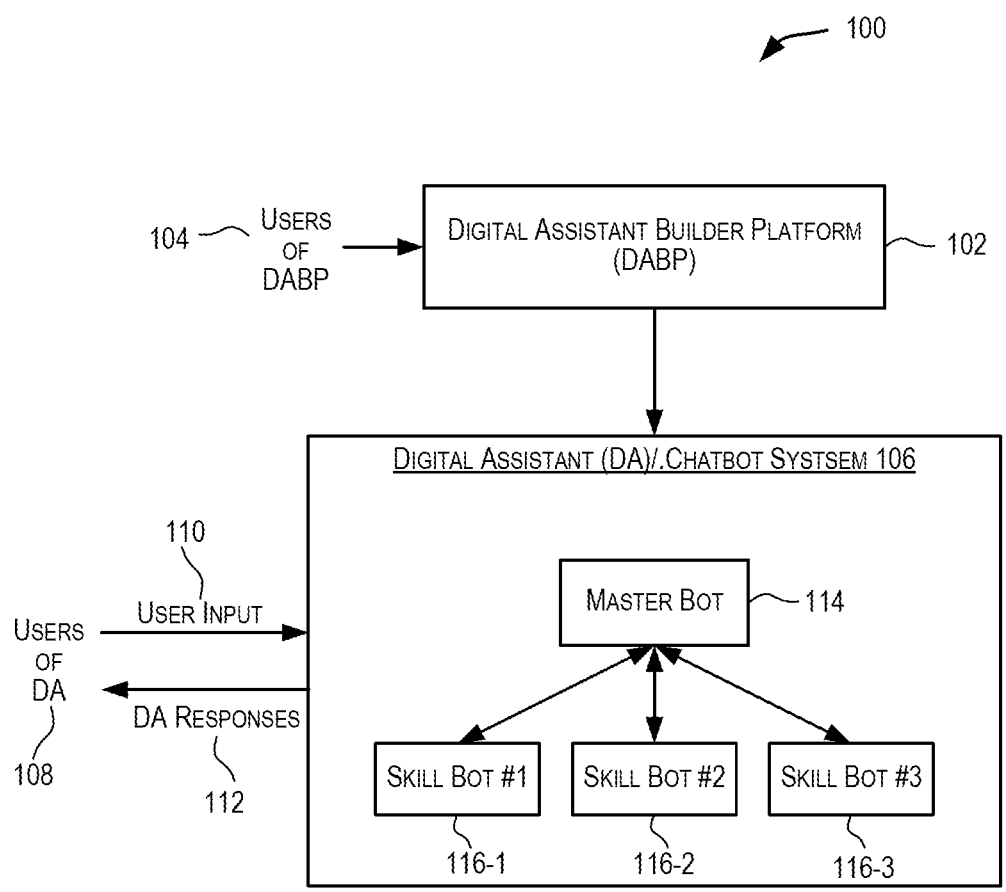
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

Artificial intelligence techniques have broad applicability. For example, a digital assistant is an artificially intelligent driven interface that helps users accomplish a variety of tasks in natural language conversations. For each digital assistant, a customer may assemble one or more skills. Skills (also described herein as chatbots, bots, or skill bots) are individual bots that are focused on specific types of tasks, such as tracking inventory, submitting timecards, and creating expense reports. When an end user engages with the digital assistant, the digital assistant evaluates the end user input and routes the conversation to and from the appropriate chatbot. The digital assistant can be made available to end users through a variety of channels such as FACEBOOK® Messenger, SKYPE MOBILE® messenger, or a Short Message Service (SMS). Channels carry the chat back and forth from end users on various messaging platforms to the digital assistant and its various bots. The channels may also support user agent escalation, event-initiated conversations, and testing.

Intents allow artificial intelligence-based technology such as a chatbot to understand what the user wants the chatbot to do. Intents refer to the user's intention communicated to the chatbot via user requests and statements, which are also referred to as utterances (e.g., get account balance, make a purchase, etc.). As used herein, an utterance or a message may refer to a set of words (e.g., one or more sentences) exchanged during a conversation with a chatbot. Intents may be created by providing a name that illustrates some user action (e.g., order a pizza) and compiling a set of real-life user statements, or utterances that are commonly associated with triggering the action. Because the chatbot's cognition is derived from these intents, each intent may be created from a dataset that is robust (one to two dozen utterances) and varied, so that the chatbot may interpret ambiguous user input. A rich set of utterances enables a chatbot to understand what the user wants when it receives messages like "Forget this order!" or "Cancel delivery!"— messages that mean the same thing but are expressed differently. Intent classifiers are included in chatbot systems to automatically classify intents of the utterances.

Utilization of artificial intelligence in the context of chatbots illustrates some of the challenges of the application of artificial intelligence techniques. For example, building a chatbot that can determine end users' intents based upon the end users' utterances is a challenging task at least due to the subtleties and ambiguity of natural language and the dimensions of the input/output space (e.g., possible user utterances, number of intents, etc.). An illustrative example of this difficulty arises from characteristics of natural language, such as employing euphemisms, synonyms, or ungrammatical speech to express intent. For example, an utterance may express an intent to order a pizza without explicitly mentioning the words pizza, ordering, or delivery. These characteristics of natural language give rise to uncertainty and result in chatbots using confidence as a parameter for prediction of user intents. As such, chatbots may need to be trained, monitored, debugged, and retrained in order to improve the performance of the chatbot and user experience with the chatbot. In conventional spoken language understanding (SLU) and natural language processing (NLP) systems, training mechanisms are provided for training and retraining machine-learning algorithms of the digital assistant or chatbot included therein. Conventionally, these algorithms are trained with "manufactured" utterances for any intent. For example, the utterance "Do you do price changes?" may be used to train a classification algorithm of a chatbot system to classify this type of utterance as the intent—"Do you offer a price match." The training of algorithms with manufactured utterances helps initially train the chatbot system for providing services and re-train the chatbot system once it is deployed and receives utterances from users.

Artificial intelligence-based technology such as a chatbot can be trained to understand the meaning of utterances, which involves identifying intents of the utterances and entities included in the utterances. Intent recognition generally has two phases: an embedding phase and a classification phase. The problem addressed here pertains to the embedding phase. In the embedding phase, typically, a contextualized embedding model is used to understand the meaning of words and strings of words of input utterances and transform them into usable formats for the classification phase. These contextualized embedding models typically perform well when embedding words of the input utterances, but do not perform as well when embedding strings of words (or sentences) of the input utterances. Prior attempts to overcome this problem have focused on fine-tuning pre-trained contextualized embedding models using domain specific datasets. A popular approach to fine-tuning relies on dual encoders with shared parameters. Under this approach, each encoder embeds a string of words followed by the calculation of a specific task/domain/dataset loss for the respective encoder (e.g., Siamese loss in Sentence-BERT, Contrastive loss). Dual encoder approaches based on a contrastive loss framework have shown to generate high quality embeddings that are aligned and uniform. Using a contrastive loss function, the pre-trained embedding model can be fine-tuned by minimizing and maximizing the similarity between embeddings for various sets of training data samples.

Conventional fine-tuning of embedding models starts with training data. However, obtaining sufficient training data for fine-tuning is challenging. Any machine-learning model is only as good as the training data it was trained on. Thus, the training data quality is determinative of the model behavior. Conventionally, these embedding models are generally fine-tuned using publicly and privately available datasets. However, these datasets are often not suitable for fine-tuning embedding models to generate representations for multilingual conversational and non-conversational type utterances. One option for generating datasets is to write additional utterances oneself and add them to the datasets. Another option is to outsource the writing of additional utterances to freelancers and/or companies dedicated to data generation and the like. Another option is to use crowd sourcing, which essentially scales the manual work using crowd workers. These approaches however can be difficult to implement for enterprise systems that employ many chatbot systems trained for many different tasks in multiple languages and are receiving a wide variety of utterances for each task. In systems employing chatbots such as these, the diversity in utterances needs to be obtained automatically in a synthetic agnostic manner to quickly and efficiently generate large corpora of training data in multiple languages and in multiple domains for many different chatbots. In some cases, conventional methods have avoided these problems by utilizing training data augmentation techniques to generate additional training data to improve performance of the intent classification tasks, but training intent classifiers is also resource-intensive and often times slow.

Accordingly, a different approach is needed to address these challenges and others. The developed approach provides techniques for generating training data to facilitate fine-tuning embedding models into entity aware multilingual embedding models for embedding words and strings of words of conversational and non-conversational type utterances. The developed approach begins with a pre-trained embedding model and a training corpus of utterances and uses an unsupervised contrastive learning framework to fine-tune and focus the pre-trained embedding model. Under the developed approach, utterances in the training corpus of utterances are used as anchor utterances and positive utterances and negative utterances are generated from the anchor utterances. Positive utterances can be generated using one or more positive operations such as translation, perturbation, and/or augmentation operations and negative utterances can be generated using one or more negative operations such as augmentation and/or sampling operations. Using the anchor utterances, positive utterances, and negative utterances to fine-tune the pre-trained embedding model under a contrastive loss function framework, the pre-trained embedding model can learn to embed words and strings words of multilingual conversational and non-conversational type utterances in an entity aware manner. With the techniques of the developed approach, multiple models can be replaced with a single model while maintaining and improving embedding performance for different types of multilingual utterances in different domains. Additionally, training time can be reduced while improving the overall performance of downstream processing task such as intent classification and query resolution.

In various embodiments, a computer-implemented method includes accessing training data, the training data comprising a plurality of anchor utterances; generating positive utterances from anchor utterances using: (i) a translation operation, (ii) one or more perturbation operations, (iii) one or more augmentation operations, or (iv) any combination thereof, and wherein the positive utterances are semantically similar to the anchor utterances; generating negative utterances from the anchor utterances using: (i) one or more augmentation operations, (ii) one or more sampling operations, or (iii) any combination thereof, and wherein negative utterances are semantically dissimilar to the anchor utterances; forming a set of tuples, each tuple of the set of tuples comprising an anchor utterance, a positive utterance selected from the positive utterances, and one or more negative utterances selected from the negative utterances, wherein a positive utterance in a respective tuple is different than positive utterances in other tuples of the tuples; generating a plurality of embeddings for each tuple of the set of tuples using a pre-trained embedding model, wherein, for a respective tuple of the set of tuples, an embedding of the plurality of embeddings is generated for the anchor utterance, the positive utterance, and the one or more negative utterances of the respective tuple; generating a fine-tuned model by fine-tuning the pre-trained embedding model, wherein fine-tuning the pre-trained embedding model comprises applying a loss function to the plurality of embeddings for each tuple of the set of tuples and minimizing the loss function for each tuple of the set of tuples; and deploying the fine-tuned model to a system. Other features and advantages of the various embodiments are apparent throughout this disclosure.

Bot Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bots to communicate with end users through a messaging application. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, the bot may be associated with a Uniform Resource Identifier (URI). The URI may identify the bot using a string of characters. The URI may be used as a webhook for one or more messaging application systems. The URI may include, for example, a Uniform Resource Locator (URL) or a Uniform Resource Name (URN). The bot may be designed to receive a message (e.g., a hypertext transfer protocol (HTTP) post call message) from a messaging application system. The HTTP post call message may be directed to the URI from the messaging application system. In some examples, the message may be different from a HTTP post call message. For example, the bot may receive a message from a Short Message Service (SMS). While discussion herein refers to communications that the bot receives as a message, it should be understood that the message may be an HTTP post call message, a SMS message, or any other type of communication between two systems.

End users interact with the bot through conversational interactions (sometimes referred to as a conversational user interface (UI)), just as end users interact with other people. In some cases, the conversational interactions may include the end user saying "Hello" to the bot and the bot responding with a "Hi" and asking the end user how it can help. End users also interact with the bot through other types of interactions, such as transactional interactions (e.g., with a banking bot that is at least trained to transfer money from one account to another), informational interactions (e.g., with a human resources bot that is at least trained check the remaining vacation hours the user has), and/or retail interactions (e.g., with a retail bot that is at least trained for discussing returning purchased goods or seeking technical support).

In some examples, the bot may intelligently handle end user interactions without intervention by an administrator or developer of the bot. For example, an end user may send one or more messages to the bot in order to achieve a desired goal. A message may include certain content, such as text, emojis, audio, image, video, or other method of conveying a message. In some examples, the bot may automatically convert content into a standardized form and generate a natural language response. The bot may also automatically prompt the end user for additional input parameters or request other additional information. In some examples, the bot may also initiate communication with the end user, rather than passively responding to end user utterances.

A conversation with a bot may follow a specific conversation flow including multiple states. The flow may define what would happen next based on an input. In some examples, a state machine that includes user defined states (e.g., end user intents) and actions to take in the states or from state to state may be used to implement the bot. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage the bot in a conversation to order pizza, where the user's intent would be represented through the utterance "order pizza." A user intent can be directed to a particular task that the user wishes the bot to perform on behalf of the user. Therefore, utterances reflecting the user's intent can be phrased as questions, commands, requests, and the like.

In the context of the configuration of the bot, the term "intent" is also used herein to refer to configuration information for mapping a user's utterance to a specific task/action or category of task/action that the bot can perform. In order to distinguish between the intent of an utterance (i.e., a user intent) and the intent of the bot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the bot to enable the intent classifier to subsequently determine whether an input utterance from a user matches the order pizza intent. Bot intents may be associated with one or more dialog flows for starting a conversation with the user and in a certain state. For example, the first message for the order pizza intent could be the question "What kind of pizza would you like?" In addition to associated utterances, bot intents may further comprise named entities that relate to the intent. For example, the order pizza intent could include variables or parameters used to perform the task of ordering pizza (e.g., topping 1, topping 2, pizza type, pizza size, pizza quantity, and the like). The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users 104 of DABP 102 to create and deploy digital assistants or chatbot systems. DABP 102 can be used to create one or more digital assistants (or DAs) or chatbot systems. For example, as shown in FIG. 1, users 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is a tool that helps users of the digital assistant accomplish various tasks through natural language conversations. A digital assistant can be implemented using software only (e.g., the digital assistant is a digital tool implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some examples, a user utterance 110 can be in audio input or speech form, such as when a user says or speaks something that is provided as input to digital assistant 106. The utterances are typically in a language spoken by the user. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some examples, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user of digital assistant 106 or are the results of conversion of input speech utterances to text form. This however is not intended to be limiting or restrictive in any manner.

For example, a user input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some examples, this processing involves a series or pipeline of processing steps including, for example, understanding the meaning of the input utterance, determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining, and reforming the utterance to develop a better understandable form (e.g., logical form) or structure for the utterance. Generating a response may include using NLG techniques.

The NLU processing performed by a digital assistant, such as digital assistant 106, can include various NLP related tasks such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain examples, the NLU processing is performed by digital assistant 106 itself. In some other examples, digital assistant 106 may use other resources to perform portions of the NLU processing. For example, the syntax and structure of an input utterance sentence may be identified by processing the sentence using a parser, a part-of-speech tagger, and/or a NER. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain examples, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, 116-3, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain examples, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a customer relationship management (CRM) bot for performing functions related to customer relationship management, an enterprise resource planning (ERP) bot for performing functions related to enterprise resource planning, a human capital management (HCM) bot for performing functions related to human capital management, etc. This way the end user or consumer of the digital assistant need only know how to access the digital assistant through the common master bot interface and behind the scenes multiple skill bots are provided for handling the user request.

In certain examples, in a master bot/child bots' infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain examples, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain examples, at a high level, creating or customizing a skill bot involves the following steps:
 (1) Configuring settings for a new skill bot
 (2) Configuring one or more intents for the skill bot
 (3) Configuring one or more entities for one or more intents
 (4) Training the skill bot
 (5) Creating a dialog flow for the skill bot
 (6) Adding custom components to the skill bot as needed
 (7) Testing and deploying the skill bot Each of the above steps is briefly described below.

(1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain examples, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances parse or otherwise process the received input and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain examples, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain examples, a portion (e.g., 80%) of the training data is used to train a skill bot model and another portion (e.g., the remaining 20%) is used to test or verify the model. Once trained, the trained model (also sometimes referred as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain examples, the dialog flow definition for a skill bot contains three sections:
(a) a context sections
(b) a default transitions section
(c) states section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition name a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill, they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) Unresolved Intent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
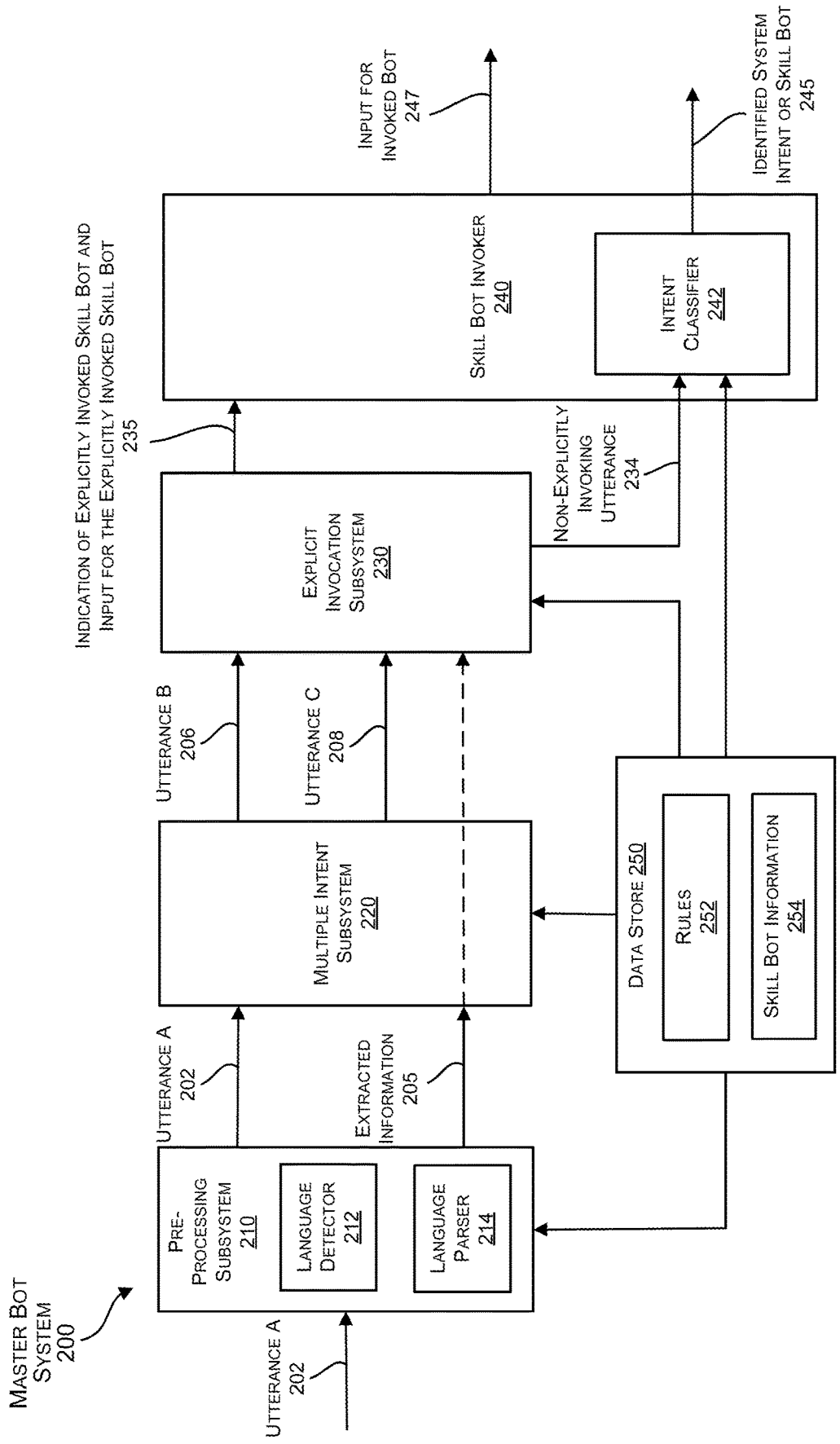
FIG. 2 is a simplified block diagram of a computing system implementing a master bot according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit card." Language parser 214 may also identify relationships between the words in the utterance 202. For example, in some embodiments, the language parser 214 generates a dependency tree that indicates which part of the utterance (e.g., a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
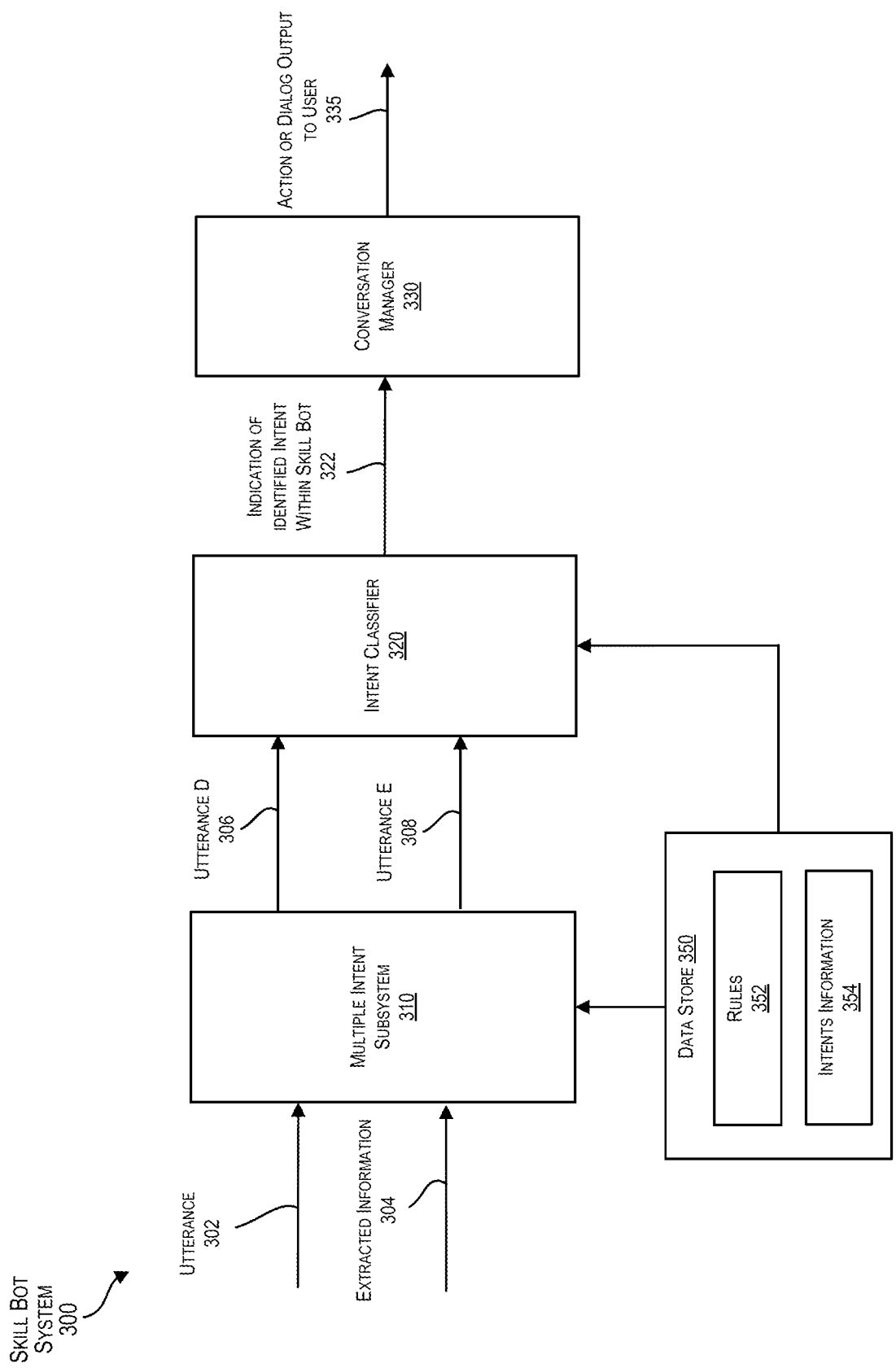
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot), or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent (e.g., "Place a pizza order using payment account X, then place a pizza order using payment account Y").

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot," then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine-learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Embedding Model

An embedding phase of an intent recognition task often involves fine-tuning a pre-trained contextualized embedding model using domain specific datasets. A popular approach to fine-tuning relies on a contrastive loss framework that fine-tunes the pre-trained embedding model by minimizing and maximizing the similarity between embeddings for various sets of training data samples. Conventionally, these embedding models are generally fine-tuned using publicly and privately available datasets. However, these datasets are often not suitable for fine-tuning embedding models to generate representations for multilingual conversational and non-conversational type utterances. These datasets can be manually generated and/or modified using resources such as crowd workers, but it can be difficult to implement for enterprise systems that employ many chatbot systems trained for many different tasks in multiple languages and are receiving a wide variety of utterances for each task. In some cases, conventional methods have avoided these problems by utilizing training data augmentation techniques to generate additional training data to improve performance of the intent classification tasks, but training intent classifiers is resource-intensive and often times slow.

In order to overcome these challenges and others, various embodiments are directed to techniques for generating training data to facilitate fine-tuning embedding models into entity aware multilingual embedding models for embedding words and strings of words of conversational and non-conversational type utterances. Using a pre-trained embedding model and a training corpus of utterances, the pre-trained embedding model can be fine-tuned based on an unsupervised contrastive learning framework. Utterances in the training corpus of utterances are used as anchor utterances and positive utterances and negative utterances are generated from the anchor utterances. Using the anchor utterances, positive utterances, and negative utterances, the pre-trained embedding model can be fine-tuned under a contrastive loss function framework. As a result, the pre-trained embedding model can learn to embed words and strings words of multilingual conversational and non-conversational type utterances in an entity aware manner. With the techniques described herein, multiple models can be replaced with a single model while maintaining and improving embedding performance for different types of multilingual utterances in different domains. Additionally, training time can be reduced while improving the overall performance of the intent recognition task. The embedding model fine-tuned using the training data generated with the techniques described herein may be implemented in a chatbot system, such as the chatbot system described with respect to FIGS. 1, 2 and 3, tailored to a specific domain and/or task and/or multiple domains and/or tasks. Advantageously, these models and chatbots will perform better on various types of utterances in multiple languages because these models are better able to recognize intents of these utterances.

Figure 4A:
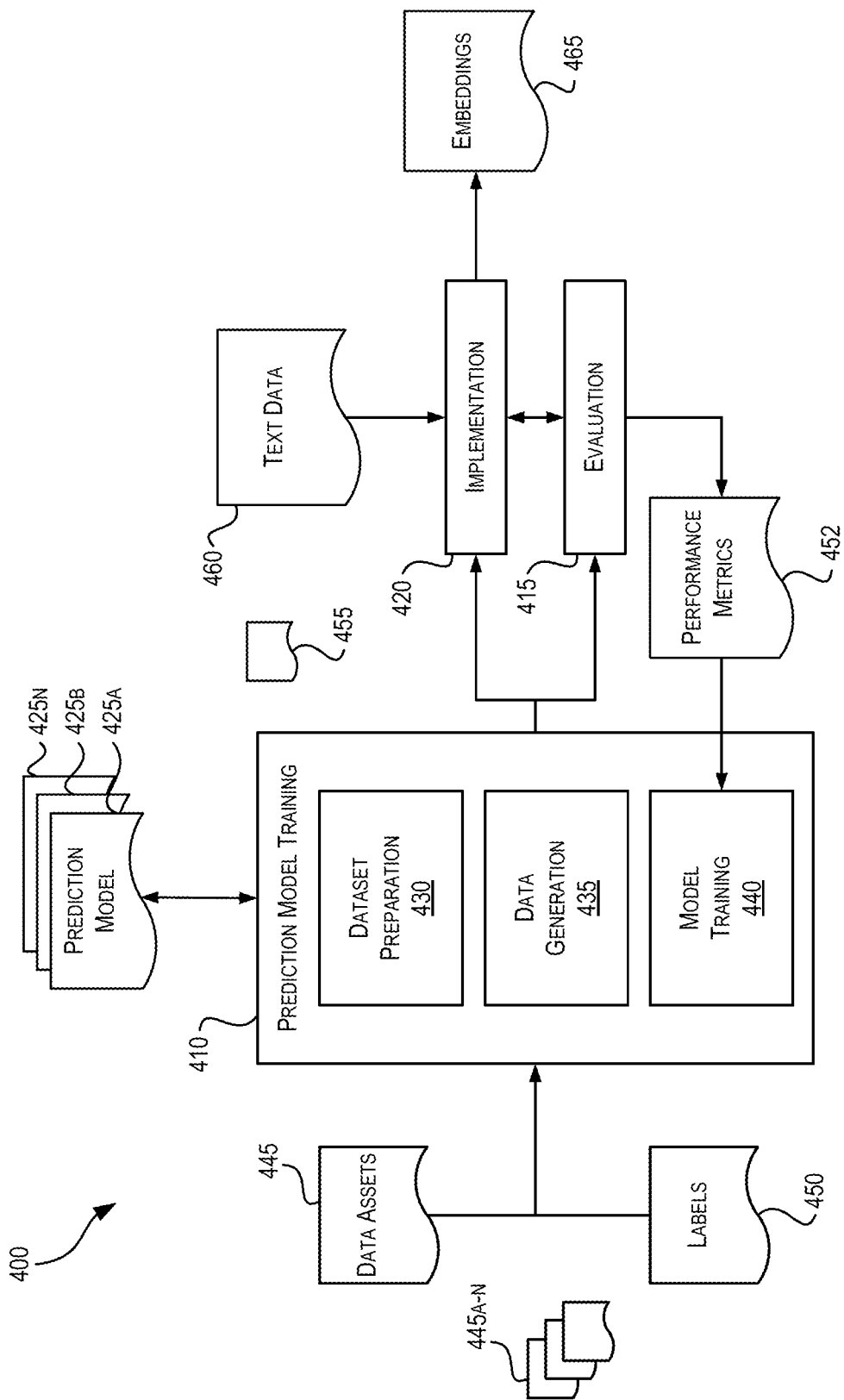
FIG. 4A is a simplified block diagram of a model training and deployment system according to certain embodiments.

FIG. 4A shows a block diagram illustrating aspects of a model system 400 configured to train and provide one or more models, e.g., an embedding model, based on text data. As shown in FIG. 4A, the model system 400 in this example includes various subsystems: a prediction model training subsystem 410 to build and train models, an evaluation subsystem 415 to evaluate performance of trained models, and an implementation subsystem 420 for implementing the models as an artificial intelligence-based solution (e.g., deployed as part of a one or more chatbots). The prediction model training subsystem 410 builds and trains one or more prediction models $425_A$-$425_N$ ('N' represents any natural number) to be used by the other subsystems (which may be referred to herein individually as a prediction model 425 or collectively as the prediction models 425). For example, the prediction models 425 can include a model for embedding words and strings of words of utterances (e.g., an embedding model), another model for predicting intents from the utterances, and another model for determining a likelihood that the utterances are representative of a task that a particular skill bot is configured to perform. Still other types of prediction models may be implemented in other examples according to this disclosure.

A prediction model 425 can be a machine-learning ("ML") model, such as a convolutional neural network ("CNN"), e.g. an inception neural network, a residual neural network ("Resnet"), or a recurrent neural network, e.g., long short-term memory ("LSTM") models or gated recurrent units ("GRUs") models, other variants of Deep Neural Networks ("DNN") (e.g., a multi-label n-binary DNN classifier or multi-class DNN classifier for single intent classification. A prediction model 425 can also be any other suitable ML model trained for natural language processing, such as a Naive Bayes Classifier, Linear Classifier, Support Vector Machine, Bagging Models such as Random Forest Model, Boosting Models, Shallow Neural Networks, or combinations of one or more of such techniques—e.g., CNN-HMM or MCNN (Multi-Scale Convolutional Neural Network). The chatbot system 400 may employ the same type of prediction model 425 or different types of prediction models 425 for embedding words and strings of words of utterances, predicting intents from the utterances, and determining a likelihood that the utterances are representative of a task that a particular skill bot is configured to perform.

To train the various prediction models 425, the prediction model training subsystem 410 is comprised of three main components: dataset preparation 430, data generation 435, and model training 440. The dataset preparation 430 includes the process of loading data assets 445, splitting the data assets 445 into training and validation sets $445_{A-N}$ so that the system can train and test the prediction models 425, and performing basic pre-processing. The splitting the data assets 445 into training and validation sets $445_{A-N}$ may be performed randomly (e.g., a 90/10% or 70/30%) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting.

The training data may include at least a subset of utterances from example utterances associated with one or more skill bots. As indicated above, an utterance can be provided in various ways including audio or text. The utterance can be a sentence fragment, a complete sentence, multiple sentences, and the like. For example, if the utterance is provided as audio, the data preparation 430 may convert the audio to text using a speech-to-text converter (not shown) that inserts punctuation marks into the resulting text, e.g., commas, semicolons, periods, etc. In some instances, the example utterances are provided by a client or customer. In other instances, the example utterances are automatically generated from prior libraries of utterances (e.g., identifying utterances from a library that are specific to a skill that a chatbot is designated to learn). The training data for the prediction model 425 can include input text or audio (or input features of text or audio frames) and labels 450 corresponding to the input text or audio (or input features) as a matrix or table of values. For example, for each training utterance, an indication of the correct entities and classification thereof to be inferred by the prediction model 425 may be provided as ground truth information for labels 450. The behavior of the prediction model 425 can then be adapted (e.g., through back-propagation) to minimize the difference between the generated inferences for various entities and the ground truth information.

The data generation 435 includes the process of using the utterances of the training data as anchor utterances to generate positive and negative utterances having diverse sets of context and entity values in any number of languages and formats to facilitate the predictive model 425 generate improved representations of the utterances. By using the utterances of the training data as anchor utterances to generate positive and negative utterances having diverse sets of context and entity values in any number of languages and formats, the predictive model 425 becomes better at generating representations of utterances. The generating of the positive and negative utterances includes multiple operations that in general include: (i) using the utterances of the training data as anchor utterances and generating positive utterances using one or more positive operations such as translation, perturbation, and/or augmentation operations; and (ii) using the anchor utterances and generating negative utterances using one or more negative operations such as augmentation and/or sampling operations. Together the anchor utterances, the positive utterances, and the negative utterances are used in an unsupervised contrastive loss framework to distill knowledge from a pre-trained embedding model to fine-tune the pre-trained embedding model. The pre-trained embedding model can be fine-tuned into an entity aware multilingual embedding model for embedding words and strings of words of conversational and non-conversational type utterances. Positive utterances, negative utterances, and fine-tuning are described in more detail below.

The training process for the prediction model 425 includes selecting hyperparameters for the prediction model 425 and performing iterative operations of inputting utterances from the augmented training data into the prediction model 425 to find a set of model parameters (e.g., weights and/or biases) that maximizes or minimizes an objective function, e.g., minimizes a loss function, for the prediction model 425. The hyperparameters are settings that can be tuned or optimized to control the behavior of the prediction model 425. Most models explicitly define hyperparameters that control different aspects of the models such as memory or cost of execution. However, additional hyperparameters may be defined to adapt a model to a specific scenario. For example, the hyperparameters may include the number of hidden units or layers of a model, the learning rate of a model, the convolution kernel width, or the number of parameters for a model. The objective function can be constructed to measure the difference between the outputs inferred using the prediction models 425 and the ground truth annotated to the samples using the labels 450. For example, for a supervised learning-based model, the goal of the training is to learn a function "h( )" (also sometimes referred to as the hypothesis function) that maps the training input space X to the target value space Y, h: X→Y, such that h(x) is a good predictor for the corresponding value of y. Various different techniques may be used to learn this hypothesis function. In some techniques, as part of deriving the hypothesis function, the objective function may be defined that measures the difference between the ground truth value for input and the predicted value for that input. As part of training, techniques such as back propagation, random feedback, Direct Feedback Alignment (DFA), Indirect Feedback Alignment (IFA), Hebbian learning, and the like are used update the model parameters in such a manner as to minimize or maximize this objective function.

Once the set of model parameters are identified, the prediction model 425 has been trained and can be tested or validated using the subset of testing data (testing or validation data set). The testing or validation process includes iterative operations of inputting utterances from the subset of testing data into the prediction model 425 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set from the subset of test data may be input into the prediction model 425 to obtain output (in this example, one or more recognized entities), and the output is evaluated versus ground truth entities using correlation techniques such as Bland-Altman method and the Spearman's rank correlation coefficients. Further, performance metrics 452 may be calculated in an evaluation subsystem 415 such as the error, accuracy, precision, recall, receiver operating characteristic curve (ROC), etc. The performance metrics 452 may be used in the subsystem 415 to analyze performance of the prediction model 425 for embedding words and strings of words of utterances.

The model training subsystem 440 outputs trained models including one or more embedding models 455. The one or more embedding models 455 may be deployed and used in the prediction model training subsystem 410 and/or implementation subsystem 420 for implementing an artificial intelligence-based solution. For example, the embedding models 455 may be used to embed the words and strings of words of the utterances in the training data and generate embeddings 465 for the words and strings of words. The training data can be used for further training the one or more embedding models 455 and/or other prediction models 425 such as intent recognitions models and named entity recognition models. Alternatively, an artificial intelligence-based solution such as a chatbot may be configured with the one or more embeddings models 455 to receive text data 460, including utterances, from one or more users and generate embeddings 465 from various utterances received by the one or more chatbots. The embeddings 465 may be part of the extracted information (e.g., extracted information 205; 304 described respectively in FIGS. 2 and 3) obtained from the text data 460, and may be used in downstream processing such as intent classification, named entity recognition, dialogue construction, data retrieval, and the like.

As discussed above, using a pre-trained embedding model and a training corpus of utterances, the pre-trained embedding model can be fine-tuned based on an unsupervised contrastive learning framework. As such, the fine-tuned embedding model can replace multiple models while maintaining and improving embedding performance for different types of utterances and overall training time can be reduced while improving the overall performance of the intent recognition task. The process begins with obtaining a training corpus of utterances and generating the training data from the training corpus of utterances. Utterances in the training corpus of utterances can be referred to as anchor utterances. The anchor utterances can pertain a single intent class (e.g., OrderPizza intent class) and/or multiple intent classes (e.g., OrderPizza, DepositMoney intent classes). One or more utterances of the anchor utterances can include one or more entities. In some implementations, the entities can be default or system entities (e.g., person, number, currency, date and time, etc.). In other implementations, the entities can be defined by a user, a customer, a developer, and the like, of a chatbot system.

Additionally, or alternatively, one or more of the anchor utterances can pertain to a part or parts of a conversation (e.g., a conversation between users and/or between a user and a machine such as the chatbot described herein). For example, one anchor utterance can be an initial utterance made by a first user and another anchor utterance can be an utterance made by a second user or computing device in response to the initial utterance made by the first user (e.g., a result of executing the first utterance on a system) and/or a follow-up utterance made by the first user with respect to the initial utterance (e.g., a subsequent query that dives deeper into the results obtained via the initial utterance), or any combination thereof. In some implementations, some or all of the anchor utterances can be contextually-independent of other anchor utterances and some or all of the anchor utterances can be contextually-dependent on other anchor utterances. A contextually-independent (i.e., non-conversational type) utterance is an utterance that is not a follow-up to a prior utterance and thus does not depend on another utterance for context. For example, the utterance: "Which state in the United States has the largest population?", may be a non-follow-up utterance because it may not follow a prior utterance and the meaning of the utterance can be determined from the words of the utterance without context of a prior utterance. On the other hand, a contextually-dependent (i.e., conversational type) utterance is an utterance that is a follow-up to a prior utterance and thus may depend on another utterance for context. For example, the utterance: "Which city in that state has the largest population?" may be a follow-up utterance because it may follow a prior utterance (the prior example) and the meaning of the utterance cannot be determined from the words of the utterance (e.g., without context from the prior utterance and/or result thereof).

The training corpus of utterances can be obtained from any publicly or privately available dataset. Several datasets are available for training purposes. An example of a publicly available dataset in which the training corpus of utterances can be obtained from is the Stanford Natural Language Inference (SNLI) corpus. Additional information for the SNLI is found in "A Large Annotated Corpus For Learning Natural Language Inference" by Bowman et al., published In Proceedings of the 2015 Conference on Empirical Methods in Natural Language Processing (EMNLP), the entire contents of which are hereby incorporated by reference as if fully set forth herein.

Figure 4B:
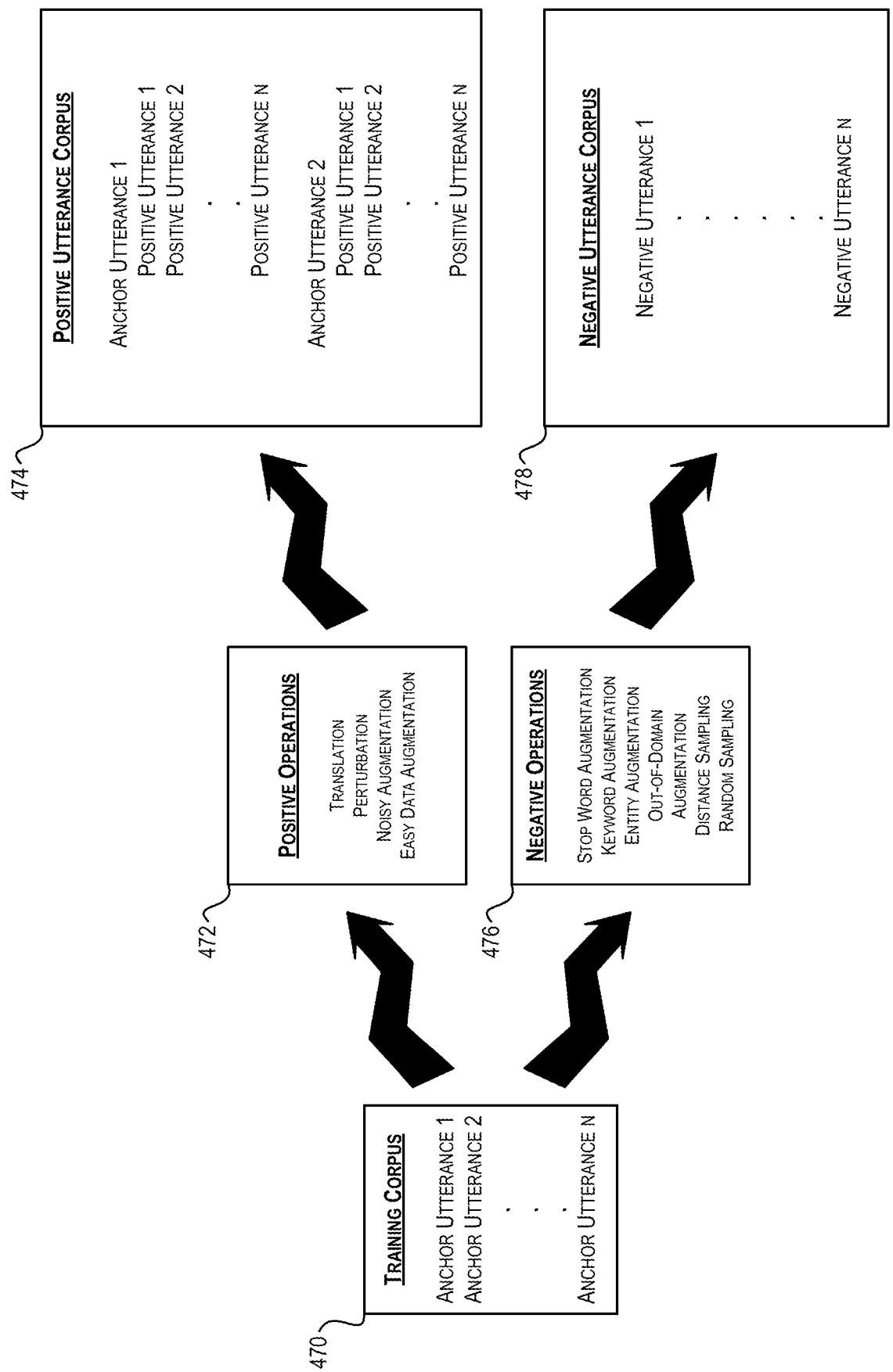
FIG. 4B illustrates an example of a simplified process for generating training data according to certain embodiments.

The training data can be generated from the training corpus of utterances by generating positive and negative utterances from the anchor utterances. A positive utterance as used herein refers to an utterance that has the same semantic meaning and intent class as an anchor utterance (e.g., an utterance in a different language or a paraphrase) and a negative utterance as used herein refers to an utterance that has a different semantic meaning and different intent class as an anchor utterance (e.g., an unrelated utterance or a contradicting utterance). As shown in FIG. 4B, the training corpus 470 can include anchor utterances (e.g., Anchor Utterances 1-N). One or more positive utterances (e.g., Positive Utterances 1-N for Anchor Utterance 1) can be generated for each anchor utterance of the training corpus 470. The one or more positive utterances can be generated using one or more positive operations 472. Examples of positive operations 472 include a translation operation, a perturbation operation, a noisy augmentation operation, an Easy Data Augmentation (EDA) operation, or any combination thereof. The one or more positive utterances can form a positive utterance corpus 474 in which the one or more positive utterances can be arranged according to the anchor utterances from which they are generated from. In this way, each generated positive utterance can form an anchor utterance-positive utterance pair for the anchor utterance used to generate the positive utterance. One or more negative utterances (e.g., Negative Utterances 1-N) can be generated for one or more anchor utterances of the training corpus 470. The one or more negative utterances can be generated using one or more negative operations 476. Examples of negative operations 476 include a stop word augmentation operation, a keyword augmentation operation, an entity augmentation operation, an out-of-domain augmentation operation, a distance sampling operation, a random sampling operation, or any combination thereof. The one or more negative utterances can form a negative utterance corpus 478. In this way, a tuple can be formed by pairing one or more of the negative utterances with the anchor utterance and positive utterance of an anchor utterance-positive utterance pair. Under an unsupervised contrastive loss function framework, a pre-trained embedding model can be fine-tuned by maximizing the similarity between an embedding for the anchor utterance and an embedding for the positive utterance of the tuple while minimizing the similarity between the embedding for the anchor utterance and embeddings for the one or more negative utterances of the tuple.

Positive Utterance Corpus

As discussed above, a positive utterance corpus 474 can be formed from positive utterances generated from anchor utterances of the training corpus 470. The positive utterances can be generated using one or more positive operations 472 such as a translation operation, a perturbation operation, a noisy augmentation operation, an EDA operation, or any combination thereof. The one or more positive utterances can be arranged in the positive utterance corpus 474 according to the anchor utterances from which they are generated from. For example, as shown in FIG. 4B, Positive Utterances 1-N generated from Anchor Utterance 1 can be arranged in the positive utterance corpus 474 accordingly. In this way, Anchor Utterance 1 can form an anchor utterance-positive utterance pair with any of Positive Utterances 1-N generated from Anchor Utterance 1.

The translation operation can be configured to generate a positive utterance from an anchor utterance by translating the anchor utterance into another language (i.e., a language that is distinct from the original language of the anchor utterance). In some implementations, one or more positive utterances can be generated for an anchor utterance by translating the anchor utterance into one or more other languages (i.e., one or more languages that are distinct from the original language of the anchor utterance). For example, a positive utterance can be generated from an English-language anchor utterance by translating the English-language anchor utterance into a Spanish-language anchor utterance and another positive utterance can be generated from the English-language anchor utterance by translating the English-language anchor utterance into a Chinese-language anchor utterance. An automated translation service can be used to perform the translations. An example of an automated translation service is included in the NLPaug library. NLPaug is an open-source library that includes tools for textual augmentation.

The perturbation operation can be configured to generate a positive utterance from an anchor utterance by perturbing the anchor utterance. The perturbing operation can perturb an anchor utterance by removing one or more words from the anchor utterance and/or changing the spelling of one or more words of the anchor utterance. For example, a positive utterance can be generated from the anchor utterance "Create expense report for the dinner yesterday" by removing the words "dinner yesterday," which results in the positive utterance "Create expense report for the." In some implementations, the perturbed anchor utterance has the same semantic meaning and intent class as the anchor utterance. An automated perturbing function can be used to perform the perturbations. An example of an automated perturbing function is included in the NLPaug library.

The noisy augmentation operation can be configured to generate a positive utterance from an anchor utterance by inserting one or more words into the anchor utterance. For example, a positive utterance can be generated from the anchor utterance "Create expense report for the dinner yesterday" by adding the words "It's such as nice day" to the anchor utterance, which results in the positive utterance "It's such a nice day; create expense report for the dinner yesterday." In some implementations, the words that are to be added can be randomly selected and inserted anywhere in the anchor utterance so long as the augmented anchor utterance has the same semantic meaning and intent class as the anchor utterance. An automated random word insertion function can be used to perform the noise augmentation operation. An example of a random word insertion function is included in the NLPaug library.

The EDA operation can be configured to generate a positive utterance from an anchor utterance by replacing words in the anchor utterance with their synonyms (i.e., synonym replacement), randomly inserting words in the anchor utterance (i.e., word replacement), randomly swapping words in the anchor utterance (i.e., random swap), and/or randomly deleting words in the anchor utterance (i.e., random delete). As used herein, random means that a word selected by the EDA operation for synonym replacement, word replacement, random swap, and random deleted is not selected in accordance with a rule or in satisfaction of a selection criteria. The EDA operation can be configured to perform the synonym replacement by randomly selecting n words from the anchor utterance that are not stop words and replacing each of the non-stop words with a synonym of the respective non-stop word. A stop word generally refers to a word in a phrase, sentence, and/or utterance that does not contribute to the meaning of the phrase, sentence, and/or utterance in a meaningful way. In NLP applications, a stop word generally refers to a word in a phrase, sentence, and/or utterance that is filtered from an utterance so that named entity recognition and/or intent classification models focus on entity values and other contextual information in the utterance rather than the stop word. For example, a positive utterance can be generated from the anchor utterance "Create expense report for the dinner yesterday" by replacing the word "expense" with "cost," which results in the positive utterance "Create cost report for the dinner yesterday." The EDA operation can be configured to perform the word replacement by searching for a synonym of a random word in the anchor utterance and inserting the synonym into a random position in the anchor utterance. For example, a positive utterance can be generated from the anchor utterance "Create expense report for the dinner yesterday" by finding the word "cost" to be a synonym of the word "expense" adding the word "cost" to the anchor utterance, which results in the positive utterance "Create expense report for the dinner cost yesterday." The EDA operation can be configured to perform the random swap by randomly selecting two words in the anchor utterance and swapping their positions in the anchor utterance. For example, a positive utterance can be generated from the anchor utterance "Create expense report for the dinner yesterday" by swapping the word "expense" with the word "dinner", which results in the positive utterance "Create dinner report for the expense yesterday." The EDA operation can be configured to perform the random delete by randomly removing one or more words of the anchor utterance. For example, a positive utterance can be generated from the anchor utterance "Create expense report for the dinner yesterday" by removing the word "expense", which results in the positive utterance "Create report for the dinner yesterday." In some implementations, the augmented anchor utterance has the same semantic meaning and intent class as the anchor utterance. Additional information for the EDA operation is found in "Eda: Easy data augmentation techniques for boosting performance on text classification tasks" by Wei et al., published in arXiv preprint arXiv:1901.11196, the entire contents of which are hereby incorporated by reference as if fully set forth herein.

The foregoing is not intended to be limiting. Various combinations of translation, perturbation, and/or augmentation operations can be used to generate a rich positive utterance corpus. Additionally, the languages, the types of perturbations, and the types of augmentations is not intended to be limiting, and many different languages, perturbations, and augmentations can be used.

Negative Utterance Corpus

As discussed above, a negative utterance corpus 478 can be formed from negative utterances generated from anchor utterances of the training corpus 470 of anchor utterances. The negative utterances can be generated using one or more negative operations 476 such as a stop word augmentation operation, a keyword augmentation operation, an entity augmentation operation, an out-of-domain augmentation operation, a distance sampling operation, a random sampling operation, or any combination thereof. The one or more negative utterances can be arranged in the negative utterance corpus 478 in no particular arrangement and/or without regard to the anchor utterance used to generate the one or more negative utterances. For example, as shown in FIG. 4B, Negative Utterances 1-N generated from one or more anchor utterances such as Anchor Utterances 1-N can be arranged in the negative utterance corpus 478 in no particular arrangement with respect to the one or more anchor utterances used to generate the negative utterances of the negative utterance corpus 478.

The stop word augmentation operation can be configured to generate a negative utterance from an anchor utterance by replacing non-stop words, if any, in the anchor utterance with a stop word (i.e., replacing any word in the anchor utterance that is not a stop word with a stop word). For example, a negative utterance can be generated from the anchor utterance "Do you offer a one day trial membership" by identifying the words "offer," "day," "trial," and "membership" as non-stop words and inserting the stop words "to," "say," "a," and "likely" in their place, which results in the negative utterance "Do you to a one say a likely." In some implementations, a list of stop words can be provided by a user, a customer, a developer, and the like, of a chatbot system. In other implementations, the list of stop words can be obtained from one or more publicly available stop word lists for a given language. In some implementations, the words that are to be added can be randomly selected and used to replace a non-stop word so long as the augmented anchor utterance has a different semantic meaning and different intent class as the anchor utterance. An automated stop word augmentation tool can be used to perform the stop word augmentation operation. An example of a stop word augmentation tool is included in the EDA techniques.

The keyword augmentation operation can be configured to generate a negative utterance from an anchor utterance by treating the anchor utterance as a negative utterance if the anchor utterance includes a keyword used in a particular context. A keyword can have different meanings depending on the context of an utterance and anchor utterances including the keyword in one particular context can be treated as a negative utterance. For example, the anchor utterance "Is the sport mode on the vehicle dynamic" can have a desired context of the keyword "dynamic" and the anchor utterance "My feedback of the new teacher is that she is dynamic" can have an undesired context of the keyword "dynamic," which results in the anchor utterance "My feedback of the new teach is that she is dynamic" being treated as a negative utterance. In some implementations, a list of keywords in a desired context can be provided by a user, a customer, a developer, and the like, of a chatbot system. An automated keyword augmentation function can be used to perform the keyword augmentation operation. An example of a keyword augmentation function is included in the NLPaug library.

The entity augmentation operation can be configured to generate a negative utterance from an anchor utterance by treating the anchor utterance as a negative utterance if the anchor utterance includes an entity. The entity can be a default or system entity (e.g., person, number, currency, date and time, etc.) and/or can be defined by a user, a customer, a developer, and the like, of a chatbot system. For example, the anchor utterance "Mike would like to order a pizza" can include a person entity, which results in the anchor utterance "Mike would like to order a pizza" being treated as a negative utterance. An automated entity augmentation function can be used to perform the entity augmentation operation. An example of an entity augmentation function is included in the NLPaug library.

The out-of-domain augmentation operation can be configured to generate a negative utterance from an anchor utterance by treating the anchor utterance as a negative utterance if the anchor utterance is out-of-domain (i.e., not related to a particular topic-of-interest, domain, and/or task). The anchor utterances of training corpus 470 can pertain to and/or be related to one or more topics, domains, and/or tasks. A particular topic-of-interest, domain, and/or task can be defined and/or selected from among different topics, domains, and/or tasks by a user, a customer, a developer, and the like, of a chatbot system. The anchor utterances 470 can be considered as either being in-domain (i.e., related to a particular topic-of-interest, domain, and/or task) and/or out-of-domain (i.e., not related to a particular topic-of-interest, domain, and/or task) based on the definition and/or selection. The out-of-domain anchor utterances can be treated as negative utterances. For example, for a "car" topic-of-interest, the anchor utterance "Mike would like to order a pizza" can be considered as being out-of-domain, which results in the anchor utterance "Mike would like to order a pizza" being treated as a negative utterance.

The distance sampling operation can be configured to generate a negative utterance from an anchor utterance by treating the anchor utterance as a negative utterance if the anchor utterance is greater than a predetermined distance from another anchor utterance. The distance sampling operation can be configured to randomly sample one or more anchor utterances from the anchor utterances of the training corpus 470 and determine whether any of the remaining anchor utterances of the training corpus 470 are greater than a predetermined distance from the one or more anchor utterances. In order to determine whether any of the remaining anchor utterance are greater than a predetermined distance from the one or more anchor utterances, each anchor utterance of the training corpus 470 can be embedded with a pre-trained sentence embedding model such as the Multilingual Universal Sentence Encoder and the embeddings for the one or more anchor utterances can be compared to the embeddings for the remaining anchor utterances to determine a distance between the respective embeddings. Any anchor utterance of the remaining anchor utterances having an embedding that is greater than a predetermined distance from the embeddings of the one or more anchor utterances can be treated as a negative utterance. Various distance measures may be used including Hamming distance, Euclidean distance, Manhattan distance (i.e., taxicab or city block), and/or Minkowski distance, and the like. Additional information for the Multilingual Universal Sentence Encoder is found in "Multilingual Universal Sentence Encoder for Semantic Retrieval" by Yang et al., published in arXiv preprint arXiv:1907.04307, the entire contents of which are hereby incorporated by reference as if fully set forth herein.

The random sampling operation can be configured to generate a negative utterance from an anchor utterance by treating the anchor utterance as a negative utterance if the anchor utterance is randomly sampled from the training corpus 470. As used herein, random means that the anchor utterance selected to be treated as a negative utterance is not selected in accordance with a rule or in satisfaction of a selection criteria. An automated random sampling function can be used to perform the random sampling.

The foregoing is not intended to be limiting. Various combinations of augmentation and/or sampling operations can be used to generate a rich negative utterance corpus. Additionally, the types of augmentations and/or sampling operations are not intended to be limiting, and many different types of augmentation and/or sampling operations can be used.

Fine-Tuning

As discussed above, the anchor utterances, positive utterances, and negative utterances can be used to fine-tune a pre-trained embedding model under a contrastive loss function framework. Tuples can be formed from the anchor utterances, positive utterances, and negative utterances. For example, a tuple can be formed by pairing one or more of the negative utterances with an anchor utterance and a positive utterance of an anchor utterance-positive utterance pair. Under an unsupervised contrastive loss function framework, a pre-trained embedding model can be fine-tuned by maximizing the similarity between embeddings for anchor utterances and embeddings for positive utterances of the tuples while minimizing the similarity between the embeddings for the anchor utterances and embeddings for the negative utterances of the tuples. As a result, the pre-trained embedding model can learn to embed words and strings words of multilingual conversational and non-conversational type utterances in an entity aware manner. The pre-trained embedding model can be any model that can generate embeddings for words and/or strings of words. Examples of the pre-trained embedding model include the Skip-Thoughts model, the Doc2Vec model, the SentenceBERT model, the InferSent model, the Universal Sentence Encoder, and the like.

Fine-tuning refers to a process for further training a pre-trained model on different training data than the training data used to initially train the model. In this context, fine-tuning refers to the process for further training the pre-trained embedding model on a data included in the training corpus 470, the positive utterance corpus 474, and the negative utterance corpus 478. The training corpus 470, the positive utterance corpus 474, and the negative utterance corpus 478 are herein referred to as generated training data. The pre-trained embedding model can be fine-tuned by re-setting or re-learning the parameters of the pre-trained sentence embedding model. The parameters of the pre-trained sentence embedding model can be re-set or re-learned based on a contrastive loss function.

The fine-tuning process begins by forming a set of tuples from the generated training data. A tuple can be formed by selecting an anchor utterance from the training corpus 470, selecting a positive utterance that corresponds to the selected anchor utterance from the positive utterance corpus 474, and selecting one or more negative utterances from the negative utterance corpus 478. One or more tuples can be formed for each anchor utterance in the training corpus 470. For example, a first tuple for Anchor Utterance 1 of the training corpus 470 can include Anchor Utterance 1, Positive Utterance 1 for Anchor Utterance 1, and Negative Utterances 4-7. In another example, a second tuple for Anchor Utterance 1 can include Anchor Utterance 1, Positive Utterance 2 for Anchor Utterance 1, and Negative Utterances 1-4.

The fine-tuning process continues by using the set of tuples in a contrastive loss function for the pre-trained embedding model. In some implementations, the contrastive loss function is configured to maximize the similarity between an embedding for the anchor utterance and an embedding for the positive utterance of a given tuple while minimizing the similarity between the embedding for the anchor utterance and embeddings for the one or more negative utterances of the given tuple. An example contrastive loss function for a pre-trained embedding model $f_\theta(\cdot)$ is shown in Equation 1.

$$\mathcal{L}_{f_\theta}(s) = -\log\left[\frac{\exp(f_\theta(s)^T f_\theta(s^+)/\tau)}{\exp(f_\theta(s)^T f_\theta(s^+)/\tau) + \Sigma_j \exp(f_\theta(s)^T f_\theta(s_j^-)/\tau)}\right] \quad [1]$$

For, a given tuple $(s, s^+, \{s_j^-\}_{j=1}^m)$ of the set of tuples, which includes an anchor utterance (s), a positive utterance (s+) corresponding to the anchor utterance (s), and one or more negative utterances $(\{s_j^-\}_{j=1}^m)$, the parameters of the pre-trained embedding model $f_\theta(\cdot)$ can be re-set or re-learned based on the contrastive loss $\mathcal{L}_{f_\theta}(s)$ of the contrastive loss function. In order to calculate the contrastive loss $\mathcal{L}_{f_\theta}(s)$, a hyperparameter $\tau$ is set, an embedding for the anchor utterance (s) is generated with the pre-trained embedding model $f_\theta(s)$, an embedding for the positive utterance (s+) is generated with the pre-trained embedding model $f_\theta(s)$, and embeddings for the one or more negative utterances $(\{s_j^-\}_{j=1}^m)$ are generated with the pre-trained embedding model $f_\theta(s)$. An embedding, as used herein, generally refers to a numerical representation of an utterance. In some embodiments, the embedding can be a multi-dimensional vector. In other embodiments, the embedding can be a one-dimensional vector. The contrastive loss $\mathcal{L}_{f_\theta}(s)$ can be calculated by determining a similarity between the embedding for the anchor utterance (s) and the embedding for the positive utterance (s+) and determining a similarity between the embedding for the anchor utterance (s) and the embeddings for the one or more negative utterances as $(\{s_j^-\}_{j=1}^m)$.

In some implementations, the hyperparameter $\tau$ can be selected and set by a user, a customer, a developer, and the like, of a chatbot system. In other implementations, the hyperparameter $\tau$ can be selected and set by a hyperparameter optimization algorithm. For the example, the hyperparameter optimization algorithm can select and set a hyperparameter based on a grid search, a random search, a Bayesian optimization, a gradient-based optimization, and the like. Once the contrastive loss $\mathcal{L}_{f_\theta}(s)$ for a given tuple and hyperparameter $\tau$ is calculated, another hyperparameter $\tau$ can be selected and set, and the contrastive loss $\mathcal{L}_{f_\theta}(s)$ for the given tuple and subsequent hyperparameter $\tau$ can be calculated. This process can continue until a hyperparameter $\tau$ that minimizes the contrastive loss $\mathcal{L}_{f_\theta}(s)$ for the given tuple is identified. Once the hyperparameter $\tau$ that minimizes the contrastive loss $\mathcal{L}_{f_\theta}(s)$ for the given tuple is identified, one or more parameters of the pre-trained embedding model $f_\theta(\cdot)$ can be selected and set based on the identified hyperparameter $\tau$. The pre-trained embedding model $f_\theta(\cdot)$ can be updated with the one or more parameters. The pre-trained embedding model $f_\theta(\cdot)$ can be updated with the one or more parameters based on techniques such as back propagation, random feedback, Direct Feedback Alignment (DFA), Indirect Feedback Alignment (IFA), Hebbian learning, and the like. In this way, the pre-trained embedding model $f_\theta(\cdot)$ can be updated based on the training data included a given tuple. Once the pre-trained embedding model $f_\theta(\cdot)$ is updated, the foregoing process can be repeated for another tuple selected from the set of tuples. In other words, for a subsequent tuple of the set of tuples, a subsequent hyperparameter $\tau$ can be identified and the updated pre-trained embedding model $f_\theta(\cdot)$ can be further updated with one or more subsequent parameters. The foregoing process can be repeated for each tuple of set of the tuples where the last update of the pre-trained embedding model $f_\theta(\cdot)$ results in a fine-tuned model.

The techniques described herein have been described with respect to a contrastive learning framework; however, the techniques described herein are applicable to other types of unsupervised learning frameworks that maximize and minimize distances between samples. Examples of other such frameworks include Siamese, triplet, circle, and the like.

Model Deployment

Figure 4C:
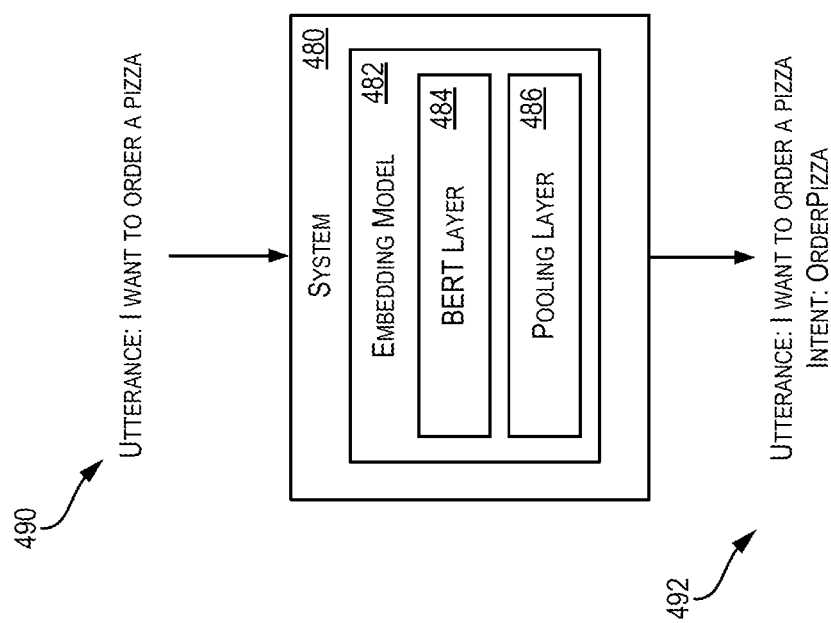
FIG. 4C is a simplified block diagram of a system for embedding utterances according to certain embodiments.

As discussed above with respect to FIG. 4A, the model training subsystem 440 outputs trained and fine-tuned models including one or more embedding models 455 that have been trained with the generated training data. An example of the one or more embedding models 455 is the fine-tuned model discussed above. The one or more embedding models 455 can be implemented in a system or artificial intelligence-based solution such as a chatbot system. A simplified block diagram of a system 480 in which an embedding model 482 can be implemented is shown in FIG. 4C. As shown in FIG. 4C, the system 480 can include the embedding model 482. Using the embedding model 482, the system 480 can receive an input utterance 490 (e.g., I want to order a pizza) and generate an output 492 that includes the utterance 490 and an intent (e.g., "OrderPizza") for the utterance 490.

The embedding model 482 can be based on a transformer-based model, such as a Bidirectional Encoder Representations from Transformers (BERT) model. In some implementations, the embedding model 482 can include a BERT layer 484 and a pooling layer 486. The BERT layer 484 can include an algorithm that accepts a sequence of words of an utterance such as the input utterance 490 as an input and generates feature vectors or sentence embeddings for the words of the sequence. In some implementations, the BERT layer 484 includes a transformer layer that includes encoders (e.g., attention mechanisms and feed-forward networks). The attention mechanisms can generate attention scores for the words of the sequence and the feed-forward networks can encode the sequence of words into a sentence embedding based on the attention scores. The pooling layer 486 can include an algorithm that accepts the sentence embedding from the BERT layer 484 and pools (i.e., conforms the dimensionality) of the sentence embedding into a usable dimension and/or format for other components of the system 480. The system 480 can also include a classifier (not shown) that can include an algorithm that accepts the pooled sentence embedding from the pooling layer 486 and classifies the pooled sentence embedding to determine an intent of the utterance.

In some implementations, the system 480 can receive the utterance and the determined intent and generate the output 492. The system 480 can use the output 492 to perform an operation such as engage in a conversation, perform a task, query a database, generate a response, and display, on a display device of the system 480 or a client device (not shown), the results of the operation.

The described construction, operations, functions, and advantages of the system 480 and the embedding model 482 are not intended to be limiting, and other construction, operations, functions, and advantages are possible and included in this description. Furthermore, while not explicitly shown, it will be appreciated that the system 480 may further include a developer device associated with a developer. Communications from a developer device to components of the system 480 may indicate what types of input data and/or utterances are to be used for the models, a number and type of models to be used, hyperparameters of each model, for example, learning rate and number of hidden layers, how data requests are to be formatted, which training data is to be used (e.g., and how to gain access to the training data) and which validation technique is to be used, and/or how the controller processes are to be configured.

Illustrative Methods

Figure 5A:
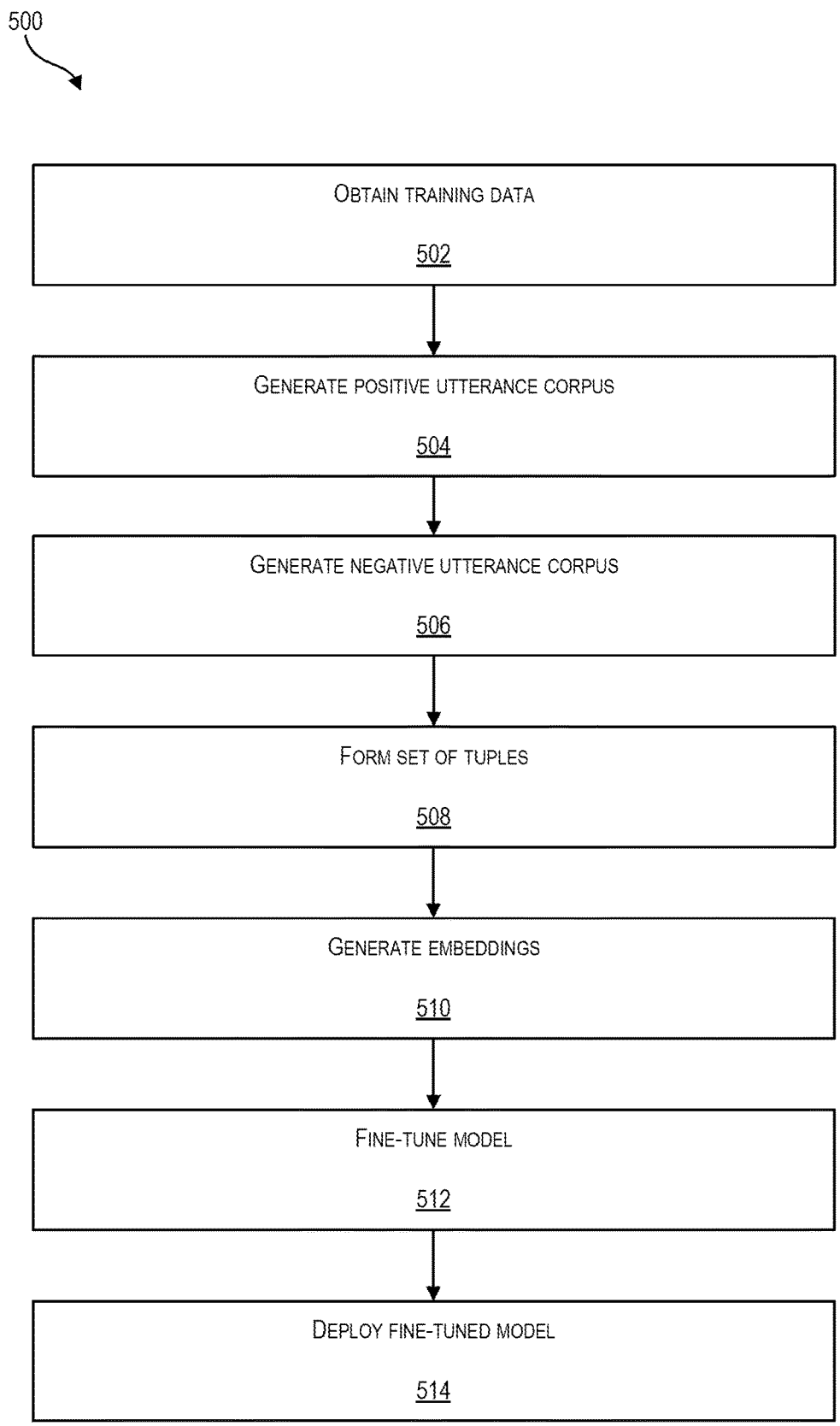
FIG. 5A is a flowchart that illustrates an example process for generating training data according to certain embodiments.

FIG. 5A is a flowchart that illustrates an example process 500 for fine-tuning a pre-trained embedding model according to certain embodiments. The processing depicted in FIG. 5A may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5A and described below is intended to be illustrative and non-limiting. Although FIG. 5A depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1-4B, the processing depicted in FIG. 5A may be performed by a pre-processing subsystem (e.g., pre-processing subsystem 210 or prediction model training subsystem 410) to generate training data to facilitate the fine-tuning of pre-trained embedding models.

At block 502, training data is obtained. The training data can include anchor utterances. The training data can be obtained from any publicly or privately available dataset.

At block 504, positive utterances are generated. The positive utterances are generated from the anchor utterances. The positive utterances are generated using: (i) a translation operation, (ii) one or more perturbation operations, (iii) one or more augmentation operations, or (iv) any combination thereof. In some implementations, each positive utterance of the positive utterances is generated by performing one or more translation, perturbation, and augmentation operations on an anchor utterance of the anchor utterances. In some implementations, the positive utterances are semantically similar to the anchor utterances. In some implementations, each positive utterance of the positive utterances has a same intent class as at least one anchor utterance of the anchor utterances.

In some implementations, the positive utterances can be generated using one or more positive operations such as a translation operation, a perturbation operation, a noisy augmentation operation, and an EDA operation. The translation operation can be configured to generate a positive utterance from an anchor utterance by translating the anchor utterance into another language (i.e., a language that is distinct from the original language of the anchor utterance). The perturbation operation can be configured to generate a positive utterance from an anchor utterance by perturbing the anchor utterance. The perturbing operation can perturb an anchor utterance by removing one or more words from the anchor utterance and/or changing the spelling of one or more words of the anchor utterance. The noisy augmentation operation can be configured to generate a positive utterance from an anchor utterance by inserting one or more words into the anchor utterance. The EDA operation can be configured to generate a positive utterance from an anchor utterance by replacing words in the anchor utterance with their synonyms (i.e., synonym replacement), randomly inserting words in the anchor utterance (i.e., word replacement), randomly swapping words in the anchor utterance (i.e., random swap), and/or randomly deleting words in the anchor utterance (i.e., random delete).

At block 506, negative utterances are generated. The negative utterances are generated from the anchor utterances. The negative utterances are generated using: (i) one or more augmentation operations, (ii) one or more sampling operations, or (iii) any combination thereof. In some implementations, each negative utterance of the negative utterances is generated by performing one or more augmentation and/or sampling operations on an anchor utterance of the anchor utterances. In some implementations, the negative utterances are semantically dissimilar to the anchor utterances. In some implementations, each negative utterance of the negative utterances has a different intent class as at least one anchor utterance of the anchor utterances.

In some implementations, the negative utterances can be generated using one or more negative operations such as a stop word augmentation operation, a keyword augmentation operation, an entity augmentation operation, an out-of-domain augmentation operation, a distance sampling operation, and a random sampling operation. The stop word augmentation operation can be configured to generate a negative utterance from an anchor utterance by replacing non-stop words, if any, in the anchor utterance with a stop word (i.e., replacing any word in the anchor utterance that is not a stop word with a stop word). The keyword augmentation operation can be configured to generate a negative utterance from an anchor utterance by treating the anchor utterance as a negative utterance if the anchor utterance includes a keyword used in a particular context. A keyword can have different meanings depending on the context of an utterance and anchor utterances including the keyword in one particular context can be treated as a negative utterance. The entity augmentation operation can be configured to generate a negative utterance from an anchor utterance by treating the anchor utterance as a negative utterance if the anchor utterance includes an entity. The entity can be a default or system entity (e.g., person, number, currency, date and time, etc.) and/or can be defined by a user, a customer, a developer, and the like, of a chatbot system. The out-of-domain augmentation operation can be configured to generate a negative utterance from an anchor utterance by treating the anchor utterance as a negative utterance if the anchor utterance is out-of-domain (i.e., not related to a particular topic-of-interest, domain, and/or task). The anchor utterances can pertain to and/or be related to one or more topics, domains, and/or tasks. A particular topic-of-interest, domain, and/or task can be defined and/or selected from among different topics, domains, and/or tasks by a user, a customer, a developer, and the like, of a chatbot system. The anchor utterances can be considered as either being in-domain (i.e., related to a particular topic-of-interest, domain, and/or task) and/or out-of-domain (i.e., not related to a particular topic-of-interest, domain, and/or task) based on the definition and/or selection. The out-of-domain anchor utterances can be treated as negative utterances. The distance sampling operation can be configured to generate a negative utterance from an anchor utterance by treating the anchor utterance as a negative utterance if the anchor utterance is greater than a predetermined distance from another anchor utterance. The distance sampling operation can be configured to randomly sample one or more anchor utterances from the anchor utterances and determine whether any of the remaining anchor utterances are greater than a predetermined distance from the one or more anchor utterances. The random sampling operation can be configured to generate a negative utterance from an anchor utterance by treating the anchor utterance as a negative utterance if the anchor utterance is randomly sampled from the anchor utterances.

At block 508, a set of tuples is formed. Each tuple of the set of tuples includes an anchor utterance, a positive utterance selected from the positive utterances, and one or more negative utterances selected from the negative utterances. In some implementations, a positive utterance in a respective tuple is different than positive utterances in other tuples of the tuples.

At block 510, embeddings are generated. The embeddings are generated for each tuple of the set of tuples. In some implementations, the embeddings are generated using a pre-trained embedding model. In some implementations, for a respective tuple of the set of tuples, an embedding is generated for the anchor utterance, the positive utterance, and the one or more negative utterances of the respective tuple.

At block 512, a fine-tuned model is generated by fine-tuning a pre-trained embedding model. The pre-trained embedding model is fine-tuned by applying a loss function to the embeddings for each tuple of the set of tuples and minimizing the loss function for each tuple of the set of tuples. In some implementations, the loss function is a contrastive loss function. In some implementations, the contrastive loss function maximizes the similarity between one or more anchor utterances of the anchor utterances and one or more positive utterances of the positive utterances. In some implementations, the contrastive loss function minimizes the similarity between one or more anchor utterances of the anchor utterances and one or more negative utterances of the negative utterances.

An example contrastive loss function for a pre-trained embedding model $f_\theta(\cdot)$ is shown in Equation 1.

$$\mathcal{L}_{f_\theta}(s) = -\log\left[\frac{\exp(f_\theta(s)^T f_\theta(s^+)/\tau)}{\exp(f_\theta(s)^T f_\theta(s^+)/\tau) + \Sigma_j \exp(f_\theta(s)^T f_\theta(s_j^-)/\tau)}\right] \quad [1]$$

For, a given tuple $(s, s^+, \{s_j^-\}_{j=1}^m)$ of the set of tuples, which includes an anchor utterance (s), a positive utterance (s+) corresponding to the anchor utterance (s), and one or more negative utterances $(\{s_j^-\}_{j=1}^m)$, the parameters of the pre-trained embedding model $f_\theta(\cdot)$ can be re-set or re-learned based on the contrastive loss $\mathcal{L}_{f_\theta}(s)$ of the contrastive loss function. In order to calculate the contrastive loss $\mathcal{L}_{f_\theta}(s)$, a hyperparameter $\tau$ is set, an embedding for the anchor utterance (s) is generated with the pre-trained embedding model $f_\theta(s)$, an embedding for the positive utterance (s+) is generated with the pre-trained embedding model $f_\theta(s)$, and embeddings for the one or more negative utterances $(\{s_j^-\}_{j=1}^m)$ are generated with the pre-trained embedding model $f_\theta(s)$. The contrastive loss $\mathcal{L}_{f_\theta}(s)$ can be calculated by determining a similarity between the embedding for the anchor utterance (s) and the embedding for the positive utterance (s+) and determining a similarity between the embedding for the anchor utterance (s) and the embeddings for the one or more negative utterances $(\{s_j^-\}_{j=1}^m)$.

In some implementations, the hyperparameter $\tau$ can be selected and set by a user, a customer, a developer, and the like, of a chatbot system. In other implementations, the hyperparameter $\tau$ can be selected and set by a hyperparameter optimization algorithm. For the example, the hyperparameter optimization algorithm can select and set a hyperparameter based on a grid search, a random search, a Bayesian optimization, a gradient-based optimization, and the like. Once the contrastive loss $\mathcal{L}_{f_\theta}(s)$ for a given tuple and hyperparameter $\tau$ is calculated, another hyperparameter $\tau$ can be selected and set, and the contrastive loss $\mathcal{L}_{f_\theta}(s)$ for the given tuple and subsequent hyperparameter $\tau$ can be calculated. This process can continue until a hyperparameter $\tau$ that minimizes the contrastive loss $\mathcal{L}_{f_\theta}(s)$ for the given tuple is identified. Once the hyperparameter $\tau$ that minimizes the contrastive loss $\mathcal{L}_{f_\theta}(s)$ for the given tuple is identified, one or more parameters of the pre-trained embedding model $f_\theta(\cdot)$ can be selected and set based on the identified hyperparameter $\tau$. The pre-trained embedding model $f_\theta(\cdot)$ can be updated with the one or more parameters. The pre-trained embedding model $f_\theta(\cdot)$ can be updated with the one or more parameters based on techniques such as back propagation, random feedback, Direct Feedback Alignment (DFA), Indirect Feedback Alignment (IFA), Hebbian learning, and the like. In this way, the pre-trained embedding model $f_\theta(\cdot)$ can be updated based on the training data included a given tuple. Once the pre-trained embedding model $f_\theta(\cdot)$ is updated, the foregoing process can be repeated for another tuple selected from the set of tuples. In other words, for a subsequent tuple of the set of tuples, a subsequent hyperparameter $\tau$ can be identified and the updated pre-trained embedding model $f_\theta(\cdot)$ can be further updated with one or more subsequent parameters. The foregoing process can be repeated for each tuple of set of the tuples where the last update of the pre-trained embedding model $f_\theta(\cdot)$ results in the fine-tuned model.

At block 514, the fine-tuned model is deployed. In some implementations, the fine-tuned model can be deployed by implementing the fine-tuned model in a system or artificial intelligence-based solution such as a chatbot system. Using the fine-tuned model, the system can receive an input utterance (e.g., I want to order a pizza) and generate an output that includes the utterance and an intent (e.g., "Order-Pizza") for the utterance.

Figure 5B:
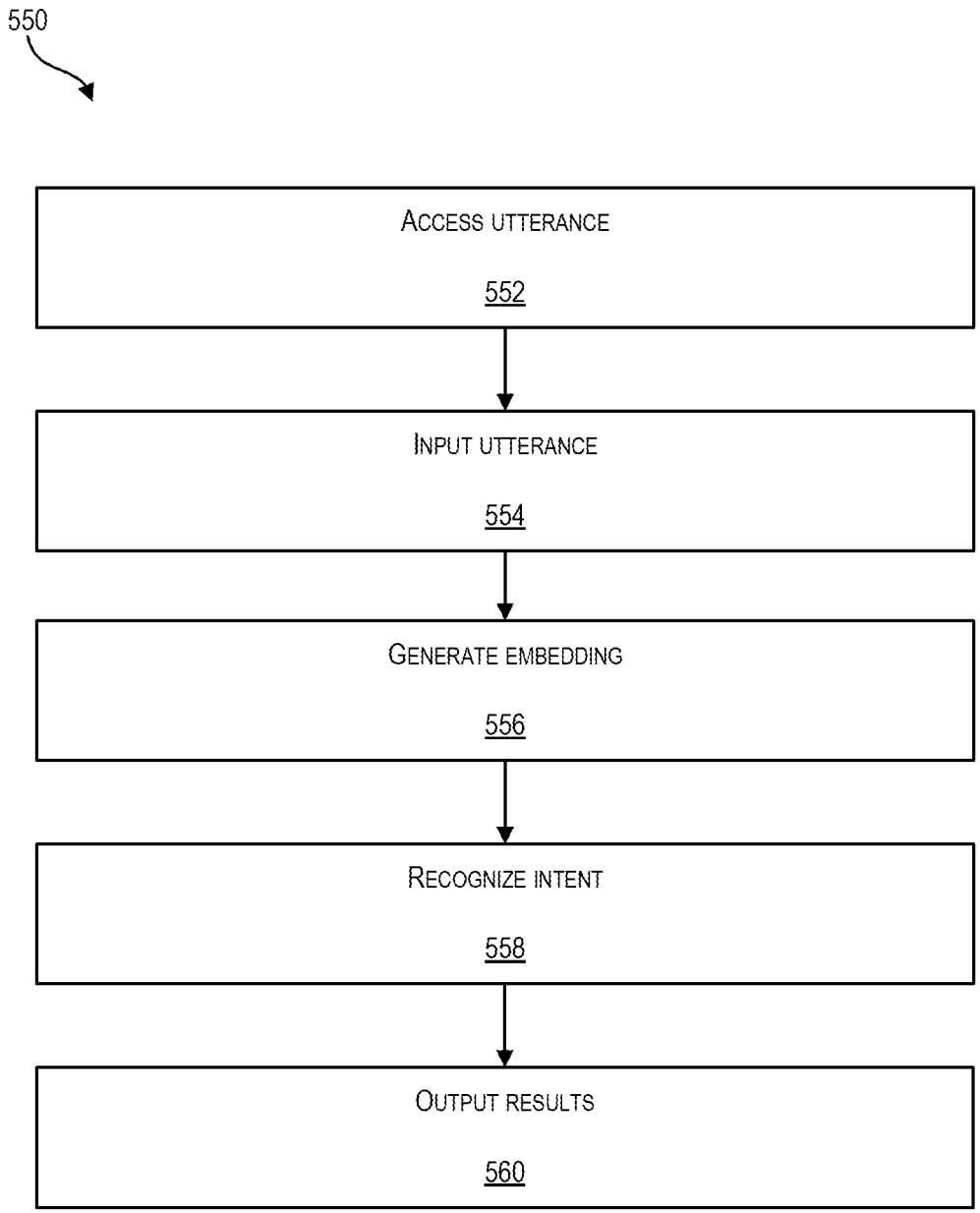
FIG. 5B is a flowchart that illustrates an example process for classifying an intent of an utterance according to certain embodiments.

FIG. 5B is a flowchart that illustrates an example process 550 for classifying an intent of an utterance according to certain embodiments. The processing depicted in FIG. 5B may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5B and described below is intended to be illustrative and non-limiting. Although FIG. 5B depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1-4B, the processing depicted in FIG. 5B may be performed by a processing subsystem (e.g., prediction model training 410, evaluation subsystem 415, and/or implementation subsystem 420) to classify an intent of an utterance using the fine-tuned model that has been fine-tuned with training data generated as described herein.

At block 552, an utterance is accessed. In some implementations, the utterance corresponds to a natural language statement, query and/or question. The utterance can be obtained from one or more sources such as a database (not shown), a computing system (e.g., data preprocessing subsystem), a user, or the like. In some implementations, the utterance can be obtained from a user interacting with the digital assistant, as described herein with respect to FIGS. 1-3.

At block 554, the utterance is input into a system. An example of a system in which the utterance is input into is a chatbot system, such as the chatbot system described with respect to FIGS. 1, 2 and 3, tailored to a specific domain and/or task and/or multiple domains and/or tasks.

At block 556, an embedding is generated for the utterance. In some implementations, the embedding can be generated using a fine-tuned model such as the fine-turned model described with respect to FIGS. 1-4B.

At block 558, an intent of the utterance is recognized based on the embedding. In some implementations, the intent of the utterance can be recognized using an intent classifier such as the intent classifier described with respect to FIGS. 1-4B.

At block 560, results of a skill performed by the system are output based on the recognized intent. In some implementations, the skill can correspond to a task, a query of a database, a request for a response. In some implementations, outputting the results of the skill includes displaying, on a display device of the system or a client device, the results.

Illustrative Systems

Figure 6:
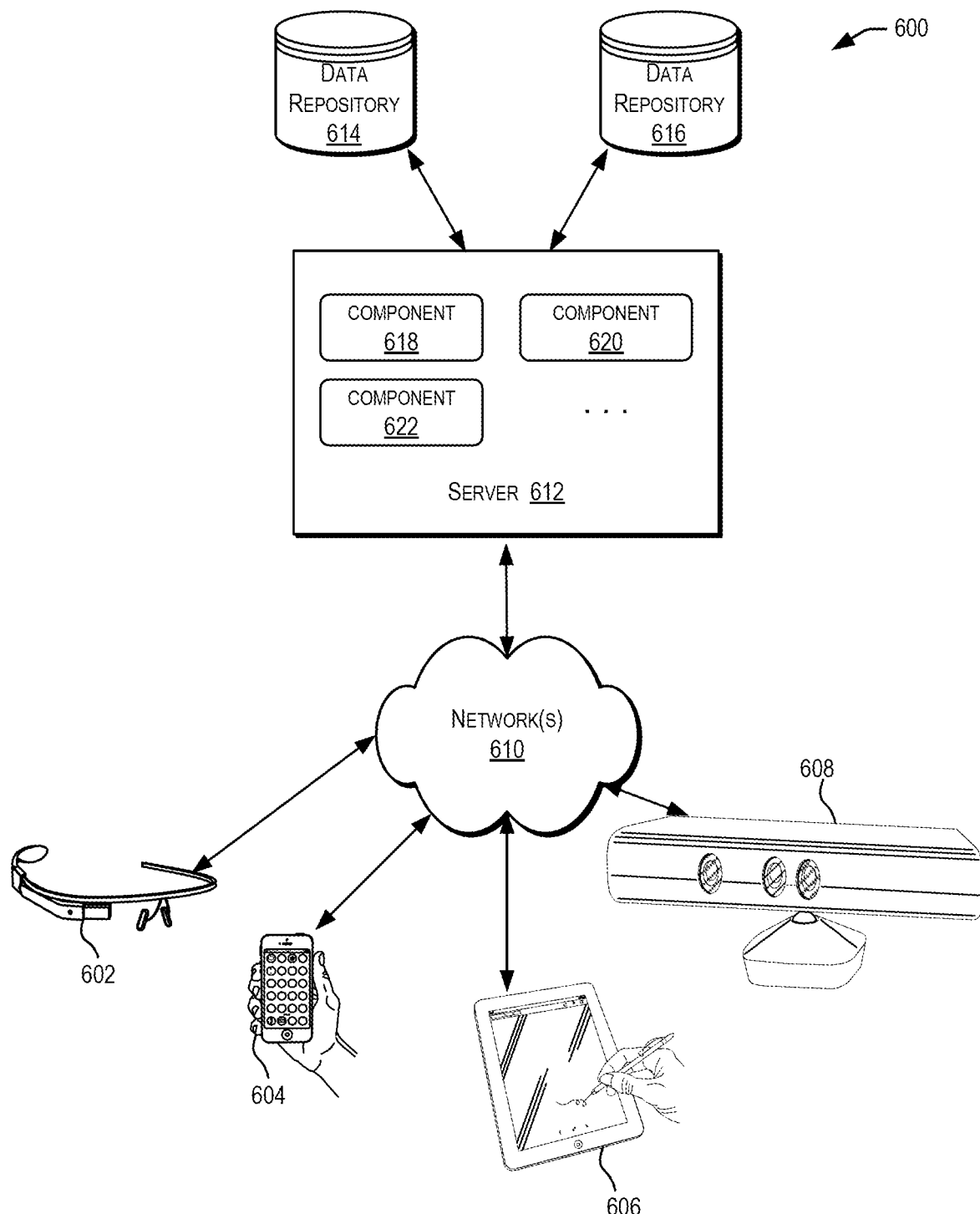
FIG. 6 depicts a simplified diagram of a distributed system for implementing various embodiments.

FIG. 6 depicts a simplified diagram of a distributed system 600. In the illustrated example, distributed system 600 includes one or more client computing devices 602, 604, 606, and 608, coupled to a server 612 via one or more communication networks 610. Clients computing devices 602, 604, 606, and 608 may be configured to execute one or more applications.

In various examples, server 612 may be adapted to run one or more services or software applications that enable one or more embodiments described in this disclosure. In certain examples, server 612 may also provide other services or software applications that may include non-virtual and virtual environments. In some examples, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The example shown in FIG. 6 is thus one example of a distributed system for implementing an example system and is not intended to be limiting.

Users may use client computing devices 602, 604, 606, and/or 608 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 may include one or more virtual machines running virtual operating systems, or other computing architectures involving virtualization such as one or more flexible pools of logical storage devices that may be virtualized to maintain virtual storage devices for the server. In various examples, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain examples. For example, one or more of the data repositories 614, 616 may be used to store information such as information related to chatbot performance or generated models for use by chatbots used by server 612 when performing various functions in accordance with various embodiments. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain examples, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 614, 616 may also be used by applications to store application data. The data repositories used by applications may be of different types such as, for example, a key-value store repository, an object store repository, or a general storage repository supported by a file system.

Figure 7:
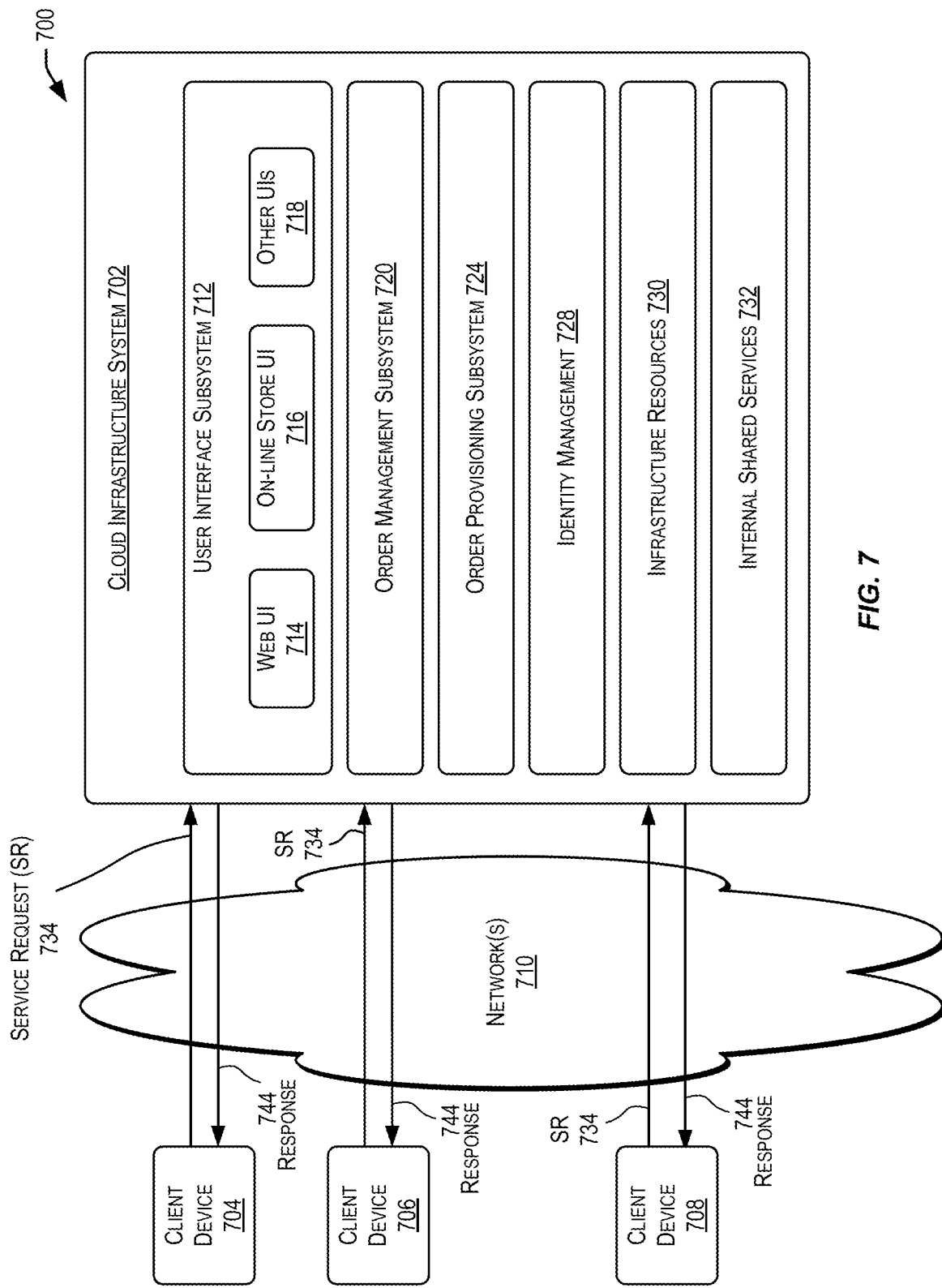
FIG. 7 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 7 is a simplified block diagram of a cloud-based system environment in which various services may be offered as cloud services in accordance with certain examples. In the example depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general-purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The example depicted in FIG. 7 is only one example of a cloud infrastructure system and is not intended to be limiting. It should be appreciated that, in some other examples, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative examples.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as middleware services, database services, Java cloud services, and others.

In certain examples, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer may be an individual or an enterprise. In certain other examples, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 702 and the services provided may be shared by several organizations in a related community. Various other models such as hybrids of the above mentioned models may also be used.

Client computing devices 704, 706, and 708 may be of different types (such as client computing devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to request information or action from a chatbot as described in this disclosure.

In some examples, the processing performed by cloud infrastructure system 702 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 702 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like. In certain examples, the storage virtual machines that are available for servicing storage requested from applications may be part of cloud infrastructure system 702. In other examples, the storage virtual machines may be part of different systems.

In certain examples, to facilitate efficient provisioning of these resources for supporting the various cloud services provided by cloud infrastructure system 702 for different customers, the resources may be bundled into sets of resources or resource modules (also referred to as "pods").

Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for a service offered by cloud infrastructure system 702. As part of the order, the customer may provide information identifying a chatbot system for which the service is to be provided and optionally one or more credentials for the chatbot system.

In certain examples, such as the example depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 702 as part of the provisioning process. Cloud infrastructure system 702 may generate an application ID and select a storage virtual machine for an application from among storage virtual machines provided by cloud infrastructure system 702 itself or from storage virtual machines provided by other systems other than cloud infrastructure system 702.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 702 and information identifying a chatbot system selected by cloud infrastructure system 702 for the chatbot system corresponding to the chatbot system ID.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain examples, cloud infrastructure system 702 comprises an identity management subsystem (IMS) 728 that is configured to manage customer information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
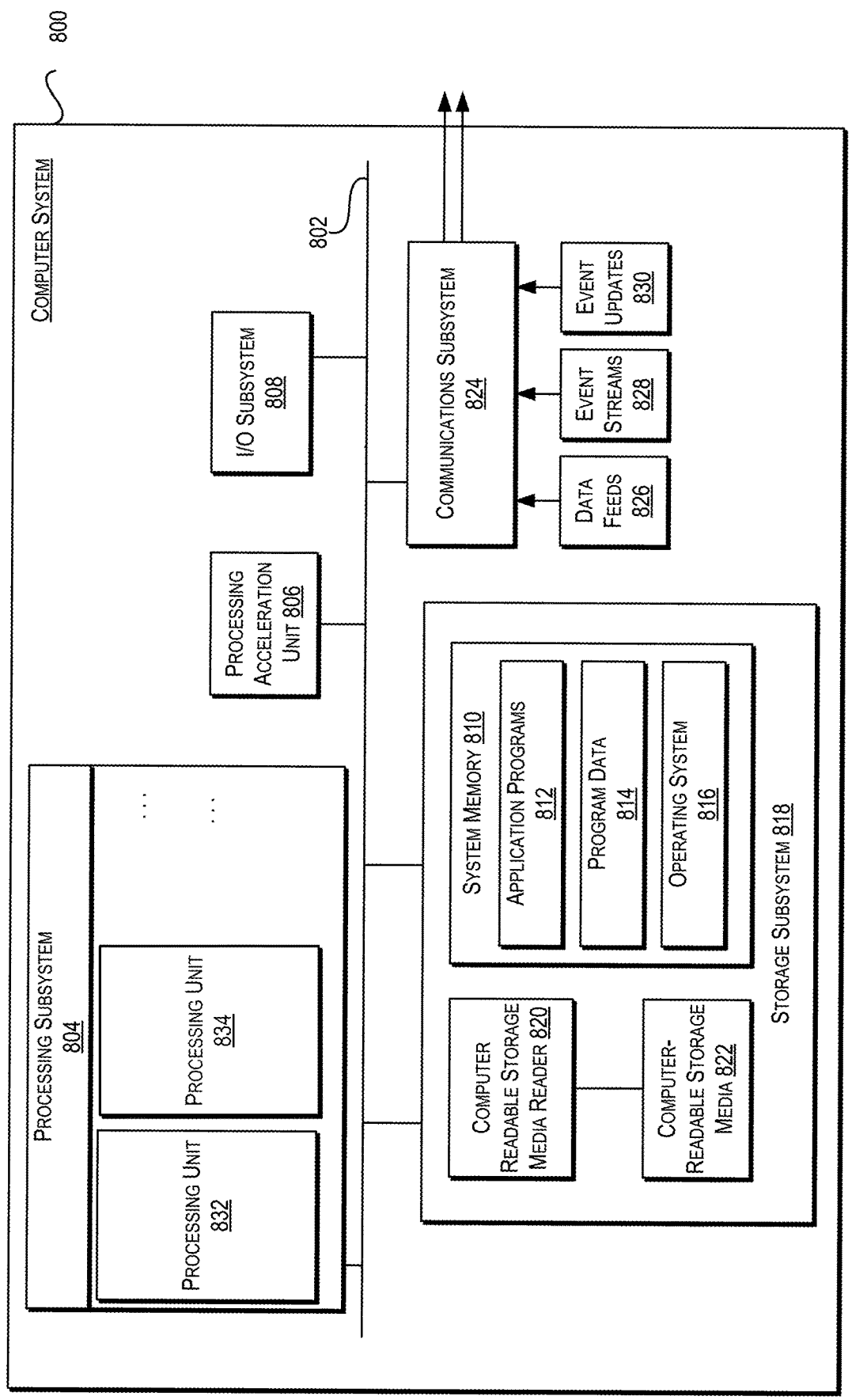
FIG. 8 illustrates an example computer system that may be used to implement various embodiments.

FIG. 8 illustrates an example of computer system 800. In some examples, computer system 800 may be used to implement any of the digital assistant or chatbot systems within a distributed environment, and various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, and I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative examples of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 may be organized into one or more processing units 832, 834, etc. A processing unit may include one or more processors, one or more cores from the same or different processors, a combination of cores and processors, or other combinations of cores and processors. In some examples, processing subsystem 804 may include one or more special purpose co-processors such as graphics processors, digital signal processors (DSPs), or the like. In some examples, some or all of the processing units of processing subsystem 804 may be implemented using customized circuits, such as application specific integrated circuits (ASICs), or field programmable gate arrays (FPGAs).

In some examples, the processing units in processing subsystem 804 may execute instructions stored in system memory 810 or on computer readable storage media 822. In various examples, the processing units may execute a variety of programs or code instructions and may maintain multiple concurrently executing programs or processes. At any given time, some or all of the program code to be executed may be resident in system memory 810 and/or on computer-readable storage media 822 including potentially on one or more storage devices. Through suitable programming, processing subsystem 804 may provide various functionalities described above. In instances where computer system 800 is executing one or more virtual machines, one or more processing units may be allocated to each virtual machine.

In certain examples, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Sin® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some examples. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide authentication in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some examples. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto resistive RAM (MRAM) SSDs, and hybrid SSDs that use a combination of DRAM and flash memory based SSDs.

In certain examples, storage subsystem 818 may also include a computer-readable storage media reader 820 that may further be connected to computer-readable storage media 822. Reader 820 may receive and be configured to read data from a memory device such as a disk, a flash drive, etc.

In certain examples, computer system 800 may support virtualization technologies, including but not limited to virtualization of processing and memory resources. For example, computer system 800 may provide support for executing one or more virtual machines. In certain examples, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, when computer system 800 is used to implement bot system 120 depicted in FIG. 1, the communication subsystem may be used to communicate with a chatbot system selected for an application.

Communication subsystem 824 may support both wired and/or wireless communication protocols. In certain examples, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some examples, communications subsystem 824 may provide wired network connectivity (e.g., Ethernet) in addition to or instead of a wireless interface.

Communication subsystem 824 may receive and transmit data in various forms. In some examples, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, it should be appreciated there are other ways and/or methods to implement the various examples.

Although specific examples have been described, various modifications, alterations, alternative constructions, and equivalents are possible. Examples are not restricted to operation within certain specific data processing environments but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, the method comprising:
   accessing training data, the training data comprising a plurality of anchor utterances;
   generating positive utterances from anchor utterances, wherein generating the positive utterances comprises generating a corresponding group of positive utterances for each respective anchor utterance of the plurality of anchor utterances, wherein each positive utterance of the positive utterances is generated using: (i) a translation operation, (ii) one or more perturbation operations, (iii) one or more augmentation operations, or (iv) any combination thereof, and wherein the positive utterances are semantically similar to the anchor utterances;
   generating negative utterances from the anchor utterances using: (i) one or more augmentation operations, (ii) one or more sampling operations, or (iii) any combination thereof, and wherein negative utterances are semantically dissimilar to the anchor utterances;
   forming a set of tuples, each tuple of the set of tuples comprising an anchor utterance, a positive utterance selected from the group of positive utterances generated for the anchor utterance, and one or more negative utterances selected from the negative utterances, wherein a positive utterance in a respective tuple is different than positive utterances in other tuples of the tuples;
   generating a plurality of embeddings for each tuple of the set of tuples using a pre-trained embedding model, wherein, for a respective tuple of the set of tuples, an embedding of the plurality of embeddings is generated for the anchor utterance, the positive utterance, and the one or more negative utterances of the respective tuple;
   generating a fine-tuned model by fine-tuning the pre-trained embedding model, wherein fine-tuning the pre-trained embedding model comprises applying a loss function to the plurality of embeddings for each tuple of the set of tuples and minimizing the loss function for each tuple of the set of tuples;
   using the fine-tuned model to generate an embedding for an input utterance;
   recognizing an intent of the input utterance based on the embedding; and
   outputting results of a skill performed by a system in which the fine-tuned model is deployed based on the intent.

2. The computer-implemented method of claim 1, wherein each positive utterance of the positive utterances is generated by performing one or more translation, perturbation, and augmentation operations on an anchor utterance of the plurality of anchor utterances.

3. The computer-implemented method of claim 1, wherein each positive utterance of the positive utterances has a same intent class as at least one anchor utterance of the plurality of anchor utterances.

4. The computer-implemented method of claim 1, wherein each negative utterance of the negative utterances is generated by performing one or more augmentation and/or sampling operations on an anchor utterance of the plurality of anchor utterances.

5. The computer-implemented method of claim 1, wherein each negative utterance of the negative utterances has a different intent class as at least one anchor utterance of the plurality of anchor utterances.

6. The computer-implemented method of claim 1, wherein the loss function is a contrastive loss function, and wherein the contrastive loss function maximizes a similarity between one or more anchor utterances of the plurality of anchor utterances and one or more positive utterances of the positive utterances.

7. The computer-implemented method of claim 1, wherein the loss function is a contrastive loss function, and wherein the contrastive loss function minimizes a similarity between one or more anchor utterances of the plurality of anchor utterances and one or more negative utterances of the negative utterances.

8. A system comprising:
   one or more processors; and
   one or more computer-readable media storing instructions which, when executed by the one or more processors, cause the system to perform operations comprising:

obtaining training data, the training data comprising a plurality of anchor utterances;

generating positive utterances from anchor utterances, wherein generating the positive utterances comprises generating a corresponding group of positive utterances for each respective anchor utterance of the plurality of anchor utterances, wherein each positive utterance of the positive utterances is generated using: (i) a translation operation, (ii) one or more perturbation operations, (iii) one or more augmentation operations, or (iv) any combination thereof, and wherein the positive utterances are semantically similar to the anchor utterances;

generating negative utterances from the anchor utterances using: (i) one or more augmentation operations, (ii) one or more sampling operations, or (iii) any combination thereof, and wherein negative utterances are semantically dissimilar to the anchor utterances;

forming a set of tuples, each tuple of the set of tuples comprising an anchor utterance, a positive utterance selected from the group of positive utterances generated for the anchor utterances, and one or more negative utterances selected from the negative utterances, wherein a positive utterance in a respective tuple is different than positive utterances in other tuples of the tuples;

generating a plurality of embeddings for each tuple of the set of tuples using a pre-trained embedding model, wherein, for a respective tuple of the set of tuples, an embedding of the plurality of embeddings is generated for the anchor utterance, the positive utterance, and the one or more negative utterances of the respective tuple;

generating a fine-tuned model by fine-tuning the pre-trained embedding model, wherein fine-tuning the pre-trained embedding model comprises applying a loss function to the plurality of embeddings for each tuple of the set of tuples and minimizing the loss function for each tuple of the set of tuples;

using the fine-tuned model to generate an embedding for an input utterance;

recognizing an intent of the input utterance based on the embedding; and outputting results of a skill performed by a system in which the fine-tuned model is deployed based on the intent.

9. The system of claim 8, wherein each positive utterance of the positive utterances is generated by performing one or more translation, perturbation, and augmentation operations on an anchor utterance of the plurality of anchor utterances.

10. The system of claim 8, wherein each positive utterance of the positive utterances has a same intent class as at least one anchor utterance of the plurality of anchor utterances.

11. The system of claim 8, wherein each negative utterance of the negative utterances is generated by performing one or more augmentation and/or sampling operations on an anchor utterance of the plurality of anchor utterances.

12. The system of claim 8, wherein each negative utterance of the negative utterances has a different intent class as at least one anchor utterance of the plurality of anchor utterances.

13. The system of claim 8, wherein the loss function is a contrastive loss function, and wherein the contrastive loss function maximizes a similarity between one or more anchor utterances of the plurality of anchor utterances and one or more positive utterances of the positive utterances.

14. The system of claim 8, wherein the loss function is a contrastive loss function, and wherein the contrastive loss function minimizes a similarity between one or more anchor utterances of the plurality of anchor utterances and one or more negative utterances of the negative utterances.

15. One or more non-transitory computer-readable media storing instructions which, when executed by one or more processors, cause a system to perform operations comprising:

obtaining training data, the training data comprising a plurality of anchor utterances;

generating positive utterances from anchor utterances, wherein generating the positive utterances comprises generating a corresponding group of positive utterances for each respective anchor utterance of the plurality of anchor utterances, wherein each positive utterance of the positive utterances is generated using: (i) a translation operation, (ii) one or more perturbation operations, (iii) one or more augmentation operations, or (iv) any combination thereof, and wherein the positive utterances are semantically similar to the anchor utterances;

generating negative utterances from the anchor utterances using: (i) one or more augmentation operations, (ii) one or more sampling operations, or (iii) any combination thereof, and wherein negative utterances are semantically dissimilar to the anchor utterances;

forming a set of tuples, each tuple of the set of tuples comprising an anchor utterance, a positive utterance selected from the group of positive utterances generated for the anchor utterance, and one or more negative utterances selected from the negative utterances, wherein a positive utterance in a respective tuple is different than positive utterances in other tuples of the tuples;

generating a plurality of embeddings for each tuple of the set of tuples using a pre-trained embedding model, wherein, for a respective tuple of the set of tuples, an embedding of the plurality of embeddings is generated for the anchor utterance, the positive utterance, and the one or more negative utterances of the respective tuple;

generating a fine-tuned model by fine-tuning the pre-trained embedding model, wherein fine-tuning the pre-trained embedding model comprises applying a loss function to the plurality of embeddings for each tuple of the set of tuples and minimizing the loss function for each tuple of the set of tuples;

using the fine-tuned model to generate an embedding for an input utterance;

recognizing an intent of the input utterance based on the embedding; and outputting results of a skill performed by a system in which the fine-tuned model is deployed based on the intent.

16. The one or more non-transitory computer-readable media of claim 15, wherein each positive utterance of the positive utterances is generated by performing one or more translation, perturbation, and augmentation operations on an anchor utterance of the plurality of anchor utterances, and wherein each positive utterance of the positive utterances has a same intent class as at least one anchor utterance of the plurality of anchor utterances.

17. The one or more non-transitory computer-readable media of claim 15, wherein each negative utterance of the negative utterances is generated by performing one or more augmentation and/or sampling operations on an anchor utterance of the plurality of anchor utterances, and wherein each negative utterance of the negative utterances has a different intent class as at least one anchor utterance of the plurality of anchor utterances.

18. The one or more non-transitory computer-readable media of claim 15, wherein the loss function is a contrastive loss function, and wherein the contrastive loss function maximizes a similarity between one or more anchor utterances of the plurality of anchor utterances and one or more positive utterances of the positive utterances.

19. The one or more non-transitory computer-readable media of claim 15, wherein the loss function is a contrastive loss function, and wherein the contrastive loss function minimizes a similarity between one or more anchor utterances of the plurality of anchor utterances and one or more negative utterances of the negative utterances.

20. The one or more non-transitory computer-readable media of claim 15, the operations further comprising:
    accessing the input utterance;
    inputting the input utterance into the system, wherein outputting the results of the skill comprises displaying the results on a display device of the system.

\* \* \* \* \*